United States Patent [19]

Leslie

[11] Patent Number: 5,023,930
[45] Date of Patent: Jun. 11, 1991

[54] BOOSTER WITH DETECTABLE BOOST OPERATION

[75] Inventor: Samuel A. Leslie, Forest, Va.

[73] Assignee: Orion Industries, Inc., Solen, Ohio

[21] Appl. No.: 194,179

[22] Filed: May 16, 1988

Related U.S. Application Data

[63] Continuation-in-part of Ser. No. 81,120, Aug. 3, 1987, Pat. No. 4,941,200.

[51] Int. Cl.⁵ .............................................. H04B 7/26
[52] U.S. Cl. ....................................... 455/9; 455/10; 455/11; 455/54; 455/33; 455/18
[58] Field of Search .................. 455/11, 12, 18, 20, 455/22, 23, 33, 34, 53, 54, 56, 68, 89, 67, 226, 10

[56] References Cited

U.S. PATENT DOCUMENTS

| | | | |
|---|---|---|---|
| 3,028,489 | 4/1962 | Chasek | 455/9 |
| 3,411,088 | 11/1968 | Hutchison | 455/9 |
| 3,450,841 | 6/1969 | Zeiser et al. | 455/20 |
| 3,913,017 | 10/1975 | Imaseki | 455/54 |
| 4,041,389 | 8/1977 | Oades | 455/17 |
| 4,163,121 | 7/1979 | Yoshikawa et al. | 379/62 |
| 4,198,600 | 4/1980 | Oguchi et al. | 455/15 |
| 4,317,216 | 2/1982 | Kaegebein | 455/16 |
| 4,317,217 | 2/1982 | Davidson et al. | 455/22 |
| 4,383,331 | 5/1983 | Davidson | 455/22 |
| 4,475,243 | 10/1984 | Batlivala et al. | 455/22 |
| 4,479,245 | 10/1984 | Batlivala et al. | 455/18 |
| 4,495,648 | 1/1985 | Giger | 455/10 X |
| 4,638,479 | 1/1987 | Alexis | 570/95 |
| 4,646,345 | 2/1987 | Zdunek et al. | 379/62 |
| 4,718,108 | 1/1988 | Davidson et al. | 455/20 |
| 4,754,495 | 6/1988 | Kawano et al. | 455/17 |

Primary Examiner—Douglas W. Olms
Assistant Examiner—Ralph Smith
Attorney, Agent, or Firm—Dressler, Goldsmith, Shore, Sutker & Milnamow

[57] ABSTRACT

An apparatus and method for selecting a number of cellular radio channels to be boosted in a given geographical area provides either F1-F1 or F1-F2 operation. The signals can be boosted at the same frequency with input to output isolation being achieved by the use of directive transmit and receive antennas physically positioned to achieve sufficient isolation. Each signal is individually filtered, amplified, and recombined for transmission. Any number of signals may be accommodated depending upon the number of retransmission channels available. Apparatus is also provided to retransmit a signal at a different frequency from that at which it is received. A tag, typically an audio tone or diminished signal amplitude gap, may be selectively applied to boosted retransmitted signals in order that they may be recognized as such.

28 Claims, 13 Drawing Sheets

5,023,930

BOOSTER WITH DETECTABLE BOOST OPERATION

REFERENCE TO RELATED PATENT APPLICATIONS

The present patent application is a continuation-in-part of patent application Ser. No. 081,120 filed Aug. 3, 1987, now U.S. Pat. No. 4,941,200 and assigned to the same assignee as the present patent application.

FIELD OF THE INVENTION

The invention pertains to electronic boosters usable to sense and to repeat or retransmit selected electronic signals. More particularly, the invention pertains to boosters usable in cellular mobile systems to improve intra-cell coverage. Still more particularly, the invention pertains to modulating a boosted cellular communication system radio signal in order that field strength, coverage and other parameters of a boosted signal can be cost-effectively determined.

BACKGROUND OF THE INVENTION

Current cellular system implementations involve the use of a few to the use of many cells to cover a given geographical area. The cells are designed to provide some degree of overlapping coverage. They are also designed to allow reuse of the same channels several cells away (but within the same geographical area).

In practice, cellular system cell-site designs do not cover all the desired coverage areas due to the anomalies of RF propagation. For example, a narrow depression in the terrain such as a ravine or along a road adjacent to a river bed may not have adequate signal coverage due to blockage from nearby terrain. Another example would be in an underground parking garage, or even in large office buildings where larger than normal signal attenuation would result in unacceptable signal levels. Furthermore, cell sites in some cellular systems are not located close enough together, thus resulting in poor coverage areas between the cells.

The addition of new cell sites to remedy such problems is prohibitive in many cases. This is because the numbers of subscribers in these areas are generally of insufficient quantity to justify the cost of a new cell site installation. A low cost alternative solution to this problem is to employ a cellular repeater or booster near the coverage area in question. Such a repeater is intended to retransmit the channels from a nearby (donor) cell into the problem area. The retransmitted channels can then be received by appropriate mobile units in the area. Likewise, transmissions from mobile units in the problem area can be retransmitted by the booster such that they can be heard by the channel receivers at the donor cell site.

Since mobiles are always under control by the cellular system in regard to which channels they are assigned to operate on, a preferred technique for signal boosting is to retransmit on the same channel on which the signal was received. This approach has no impact on the signaling operation of either the cellular system or the mobile, but does require careful control and attention to the installation of the booster to prevent RF feedback oscillation. Separate antennas arranged to maximize isolation are used to provide sufficient margin between the received and retransmitted signals. RF amplifier gain through the retransmission path must be limited to a nominal value of less than the amount of isolation between the two antennas under all operating conditions.

Also, the problem is complicated by the current implementation of the cellular system spectrum. The spectrum is currently split between a "wireline" and a "non-wireline" carrier. Each carrier has available a minimum of 21 control channels to be used for assigning mobiles to voice channels, and for placing and receiving calls to and from the mobiles. The control channel groups of the two carriers are adjacent to each other in the center of the cellular band. The adjacent locations of the control channel groups require special control and coordination between the two carriers to prevent unwanted mobile responses from the other carrier's cell site equipment.

Current cellular booster implementations employ broadband linear amplifiers with filtering to eliminate out-of-band signals. These approaches generally provide a degree of signal enhancement in the area of the booster for a mile or so, which generally is all that is desired in the majority of the cases. However, several problems have been experienced with this solution.

Multiple signals through the broadband linear amplifier create spurious intermodulation products. These products may cause interference with other mobiles and/or stations in the cellular system, interference with competing or adjacent cellular systems, and interference with non-cellular services adjacent to but outside of the cellular bands. Imperfections in even highly-linear amplifiers will cause generation of these unwanted spurious products.

In addition, the competing system's control channel set is immediately adjacent to the control channel set of the target cellular system being repeated. This creates a difficult filtering requirement to prevent the wrong control channels from being amplified. Broadband boosters typically repeat both sets of control channels. This could result in lost mobile calls for the competing system if the booster amplifier did not cover the entire voice band of the competing system.

Finally, an interference region is created on those control channels where signals from the primary source (cell site or mobile) are at or near the same signal level as the boosted or enhanced signal. Signaling completion in these regions is difficult, with many lost calls being a result. Boosted voice signals in these regions are not nearly as affected, since the human ear will integrate out the rapid signal level variations caused by the nearly equal signal levels.

These problems result in limiting the applications and hence the number of areas where such boosters can be installed.

Current known systems employ broadband linear amplifiers for repeating the desired cellular band on an F1-F1 basis (i.e., same frequency out as the same frequency in). Separate antennas usually with highly directive patterns are employed to both achieve isolation between the transmit and the receive antennas, and to minimize the radiation of interfering signals to locations other than the area intended.

To overcome the filtering problem involved in preventing the repeating of the adjacent or competing cellular system's control channels, a combination of a narrow band channel amplifier set to the desired control channel and a broadband amplifier with a reasonably sharp filter for the voice channel set may be used. In this manner, the band pass response of the voice channel broad band filter may be selected such that the competing system's control channels are attenuated sufficiently to prevent improper operation with the competing cellular system.

Also, automatic reduction of the gain of the broadband amplifier via the use of analog AGC circuits has been used to prevent nonlinear operation (and the subsequent unwanted generation of excessive intermodulation products). The disadvantage of this approach, however, is that the weaker signals being repeated may be suppressed to unacceptable levels when nearby mobiles are transmitting. The use of automatic power control by the cellular system may help this situation somewhat; but there will be situations where a nearby mobile may be operating on a cell other than the target "donor" cell, and thus would not be under the control of the donor cell.

The use of individual channel filters to overcome the intermodulation problem has been viewed as uneconomical, since such an approach would require a channel set for every channel that may be installed in the donor cell. Since the area being covered by the booster will generally have a much lower subscriber "population" than that covered by the donor cell, there would be no need to repeat all the donor channels. In fact, there are many areas where a system operator may want to provide coverage but the expected subscriber population is such that only a couple of channels may be needed.

Implementation of the cellular system to determine which channel(s) the cellular booster should repeat would normally require system control of such a complexity that it would be on the order of a standard cell site implementation. Since there could well be many more boosters than cell sites in a given cellular system (i.e., to provide coverage into individual buildings), the designers of the cellular system equipment would understandably be disinclined to dedicate system processing facilities to cover these booster stations. Also, the design of such a cellular booster would be highly dependent on the type of system employed.

Hence, there continues to be a need for cost-effective boosters usable in cellular mobile systems. Such boosters preferably will repeat a limited number of channels without generating spurious signals.

Still an additional problem exists in assessing and quantifying the performance of boosters usable in cellular communications systems. Current practice in determining coverage from a booster that is operating in the cellular service is to first identify the geographical characteristics of the area to be boosted.

This can be accomplished by riding or walking around the area with a cellular mobile or portable and determining the areas where coverage is not provided. Next, the booster is turned on, and typically is adjusted to the maximum gain allowed with the given antenna isolation available.

The area is again tested, in the same way to determine whether the coverage problems have been fixed. The disadvantages with this approach are that it is time consuming, and there is little knowledge obtained regarding whether there is too much coverage (i.e., excessive overlap into areas already adequately covered by the cell site).

Hence, there is a need for an efficient, cost-effective method of determining the coverage area, and coverage effects, of a cellular communications system booster.

SUMMARY OF THE INVENTION

In accordance with the invention, a method and an apparatus are provided for selecting one or more of a plurality of cellular mobile communications signals which would benefit from being boosted. The apparatus includes a plurality of communications paths for providing communications from a cell site to one or more mobiles active in a region of coverage of the cell site. The apparatus also includes a plurality of communication paths for providing communication between the one or more active mobiles and the cell site.

The cell site is in radio frequency transmission with the apparatus by means of highly directive antennas. Input from the cell site, at a radio frequency range of 824–849 megahertz, is passed through a duplexer. Incoming signals from the duplexer are separated in a multi-coupler. Output signals from the multi-coupler is a plurality of parallel radio frequency communication paths in the same 824–849 megahertz frequency range.

Each of the communications paths includes an intermediate frequency amplification block. The intermediate frequency amplification block provides for amplification of the audio or control signal carried by the RF signal. Output from each of the intermediate frequency blocks, the amplified RF signals is amplified in an RF amplifier. The outputs of each RF amplifier, from each intermediate frequency block, are combined in a high-power combiner. Output of the combiner, coupled, through a duplexer, is transmitted by an antenna to the mobile units.

Incoming signals from the active mobile units pass through the duplexer and are split in a multi-coupler. The separated parallel signals pass through a plurality of parallel intermediate frequency blocks, of the type noted above. Output from each of the intermediate frequency blocks, an amplified RF signal, is combined in a combiner into a single output signal. This output signal is amplified in a linear output amplifier and transmitted through a duplexer. Output from the duplexer, via the directional antenna, is transmitted to the cell site.

The apparatus operates under the control of a stored program control unit. The stored program control unit can include a microprocessor along with random-access memory for temporary storage, electrically erasable read-only memory for nonvolatile storage and electrical programmable read-only memory for control program storage. An interface port can be provided to the microprocessor for diagnostic and test purposes.

Further, in accordance with the invention, the method includes steps of setting an initial minimum threshold and a higher "action" threshold. An active mobile channel is scanned. The signal on the active mobile channel is tested to determine whether or not it exceeds the minimum, predetermined threshold. If not, that signal is not a candidate for boosting or repeating. If the sensed signal does exceed the minimum threshold it is then tested to determine whether or not it exceeds the "action" threshold. If it exceeds the "action" threshold and it is currently being repeated the signal on the next available channel is then considered.

If the present signal exceeds the "action" threshold but is not being repeated, the last J readings in a storage stack associated with the present signal are set to the current reading. An identifier of the present channel is then stored, indicating this channel is a potential candidate for boosting.

In the event that the present signal does not exceed the "action" level threshold, an indicator of its strength is stored on an associated stack. In the event that the present channel is currently being boosted, a determination is made as to whether or not the last I out of K readings exceed the minimum threshold. If not, then the channel is removed from the table of those to be boosted. If the last I out of K readings exceed the minimum threshold, then the next channel is examined.

In the event that the present signal is not currently being boosted, a determination is made as to whether or not the last I out of J readings of the signal exceed the minimum threshold. If not, the channel is not a candidate for boosting. If so, an average value of the last I out of J readings is formed and stored in a list indicating the present channel is a potential candidate for boosting.

The remaining channels are then examined. Subsequent to all of the channels having been examined, a determination is made as to whether or not there are more candidates for boosting than there are available repeater channels. If not, then a determination is made as to whether or not the list of active channels is different from the list of channels to be boosted. If so, necessary channels are either dropped or added, based on the current list of those to be boosted. If the number of candidate channels exceeds the number "n" of available repeater channels, the "n" strongest candidate signals are selected.

The above method and apparatus can be utilized to provide an F1-F1 mode of operation wherein the boosted signal is transmitted at the same frequency as it is received. Additionally, the above-noted method and apparatus can be operated in an F1-F2 mode of operation wherein the incoming signal is retransmitted, after having been boosted, at a different frequency.

In accordance with the invention, it is possible to determine the relative contributions to a composite received signal of a first signal communicated from a transmitter to a receiver across a first, direct, signal path and a second signal simultaneously communicated from the same transmitter to the same receiver across a second, indirect boosted, signal path. The determination transpires by tagging at a booster within the second signal path the boosted second signal with identifier. In the disclosed embodiment, an audio information tag is used.

At the receiver, the audio information tag within the tagged boosted second signal is detected within the composite received signal. The detected strength of the tag relative to the strength of the entire composite signal serves to indicate the relative contribution of the second, boosted, signal to the composite combination of both the first and the second received signals.

In one variant the audio information tag can be implemented with a modulated audio frequency tone. Phase angle modulation or frequency modulation can be used. In another variant the modulating is by amplitude gating in order to create a gap or null, or reduced amplitude in the boosted signal.

When the boosted signals within a system are so modulated, user moving about in the coverage area can determine whether the signal is being received through the booster, whether the signal is being received directly from the donor cell, or whether the signal is being received more or less equally from both sources.

Numerous other advantages and features of the present invention will become readily apparent from the following detailed description of the invention and the embodiments thereof, from the claims and from the accompanying drawings in which the details of the invention are fully and completely disclosed as a part of this specification.

DETAILED DESCRIPTION OF THE PREFERRED EMBODIMENT

Figure 1:
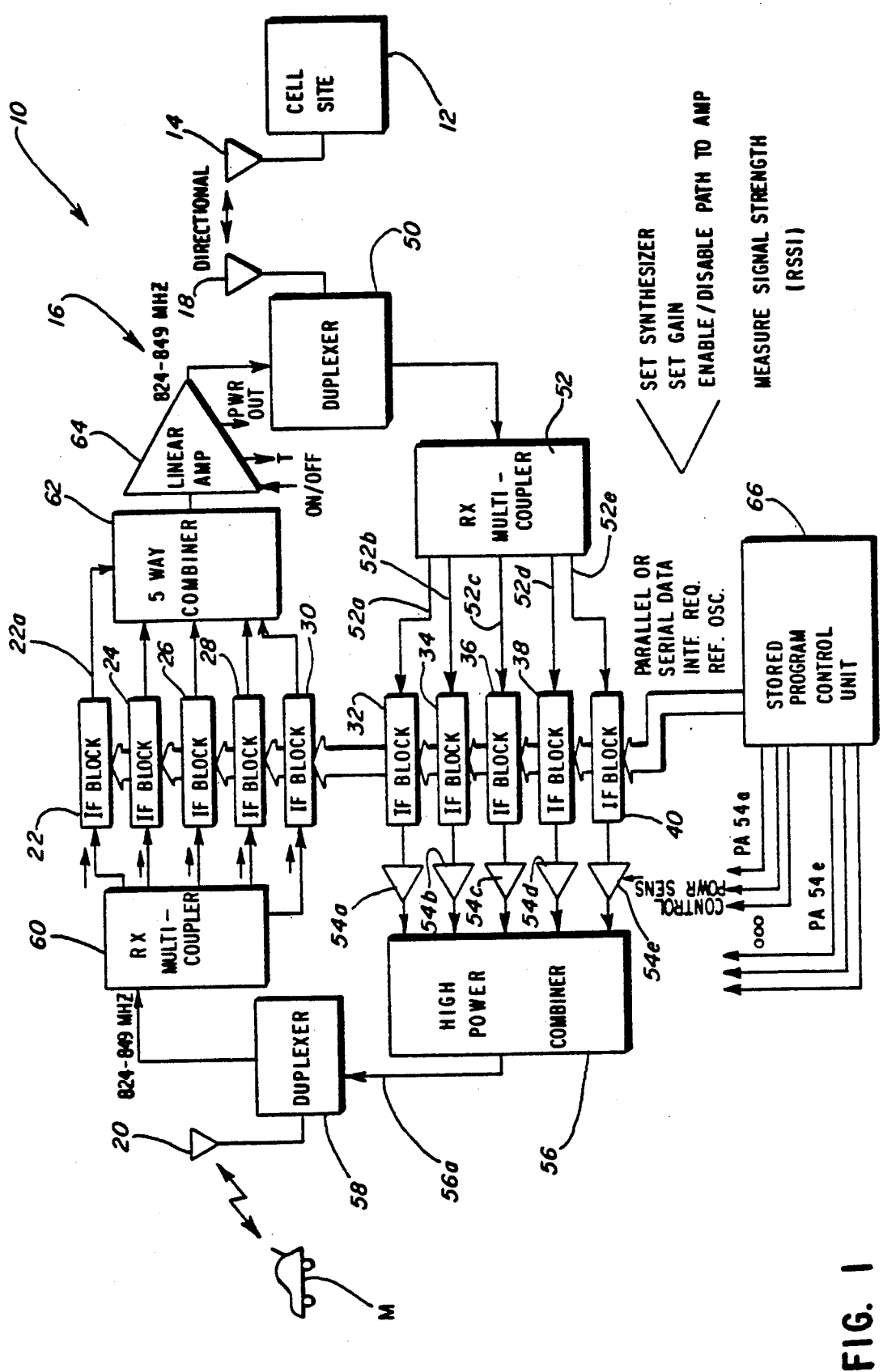
FIG. 1 is an overall schematic block diagram illustrating a booster in accordance with the present invention.

While this invention is susceptible of embodiment in many different forms, there is shown in the drawing and will be described herein in detail a specific embodiment thereof with the understanding that the present disclosure is to be considered as an exemplification of the principles of the invention and is not intended to limit the invention to the specific embodiment illustrated.

FIG. 1 illustrates a system 10 in accordance with the present invention. The system 10 includes a fixed cell site 12 of a conventional variety used in connection with cellular mobile radio telephone service. The cell site 12 includes a transmitting and receiving antenna 14.

A booster 16 is illustrated in FIG. 1 in bidirectional communication with the cell site 12 and a mobile unit M. The booster 16 includes a directional transmit and receive antenna 18 which is used to transmit signals to and receive signals from the cell site 12. The booster 16 also includes a second antenna 20 for transmitting signals to and receiving signals from the mobile unit M. The antenna 20 can be, but need not be, a directional antenna. The booster 16 can repeat both voice and control channels in connection with a cellular mobile transmission. The repeated channel can be repeated at the same frequency as received. Alternately, the booster 16 can shift the transmitted frequency from the received frequency.

Figure 4:
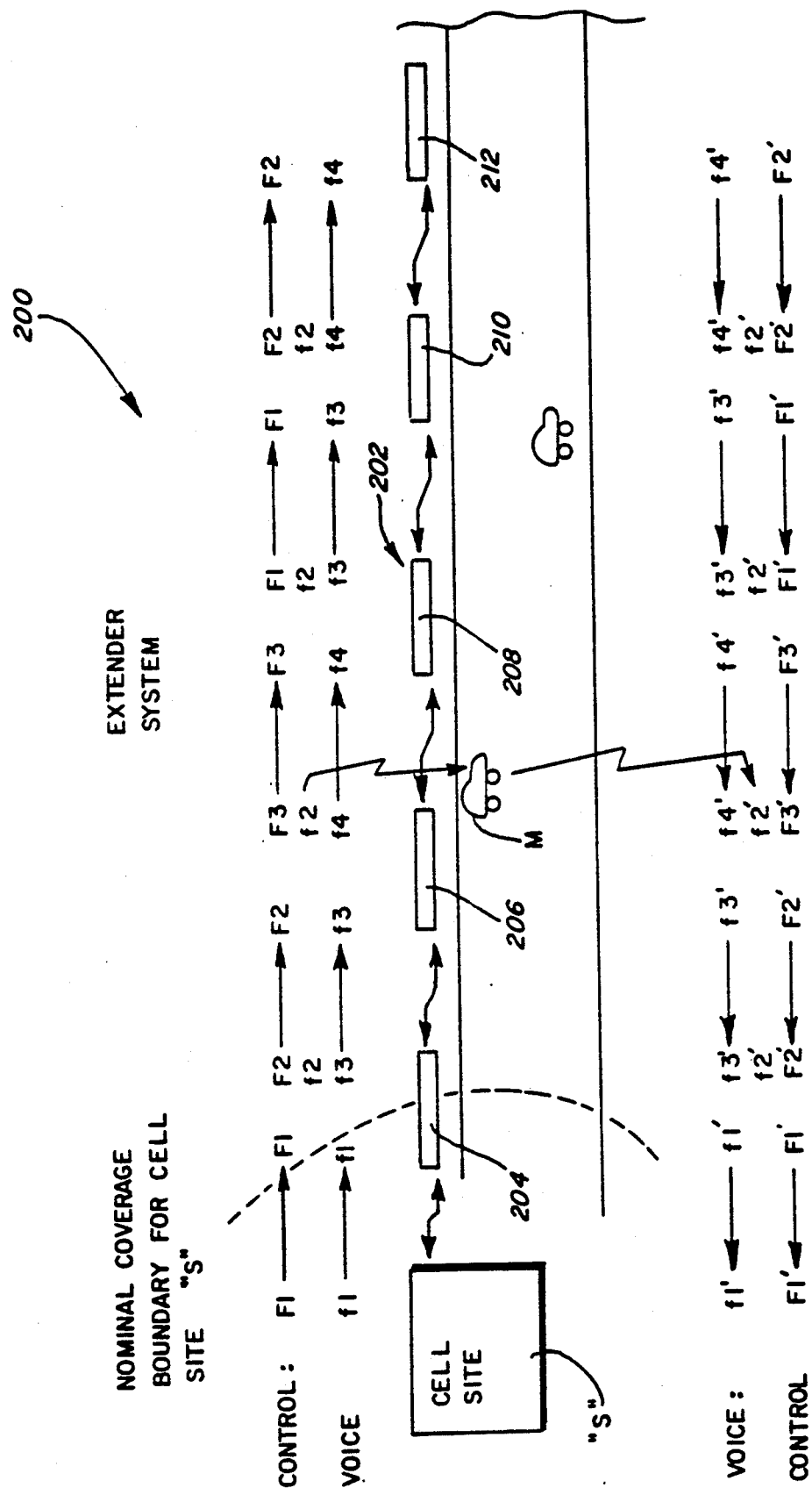
FIG. 4 is an over-all diagram, of all extender system incorporating a plurality of boosters of the type illustrated in FIG. 1.
Figure 5:
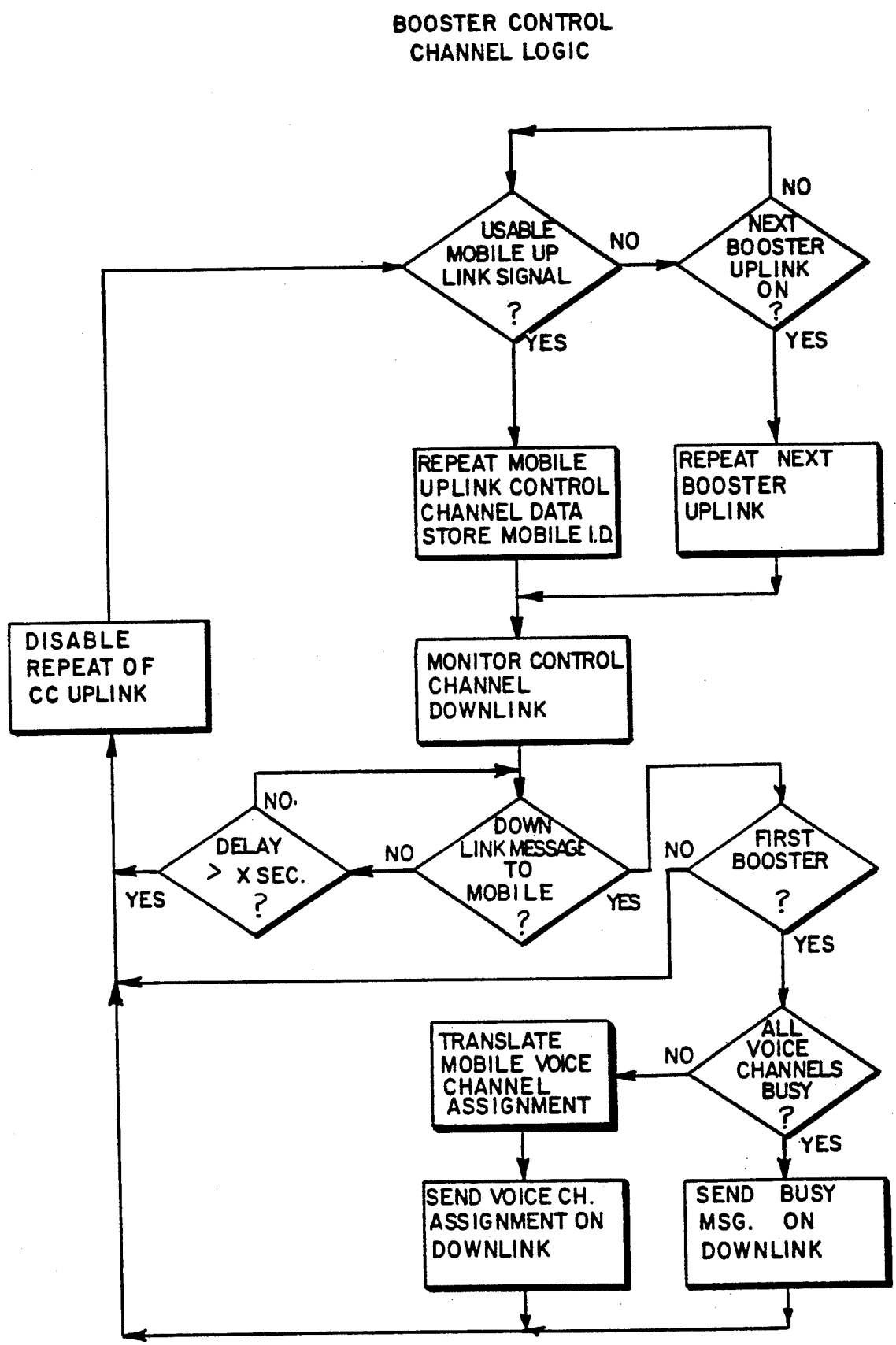
FIG. 5 is a flow diagram of control channel repeating by a booster in the extender system of FIG. 4.
Figure 6:
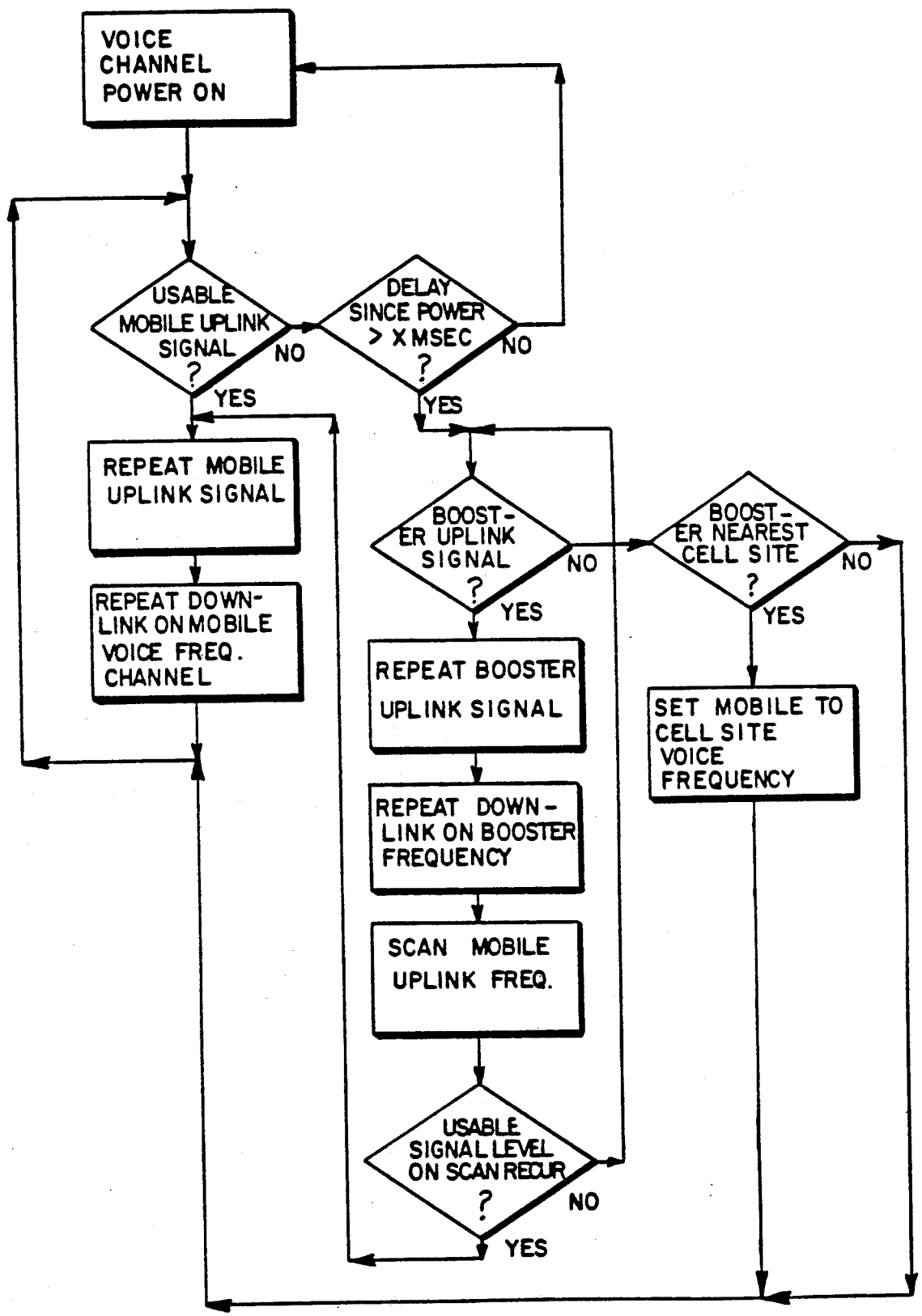
FIG. 6 is a flow diagram of voice channel repeating by a booster in the extender system of FIG. 4.

FIG. 4 is an overall diagram of a cell extender system incorporating a plurality of boosters of the type illustrated in FIG. 1;

FIG. 5 is a flow diagram of control channel repeating by a booster in the extender system of FIG. 4; and FIG. 6 is a flow diagram of voice channel repeating by a booster in the extender system of FIG. 4.

The booster 16 includes a plurality of communication paths such as channel paths 22-30 which provide for transmission of five channels of control or audio in parallel between the mobile unit M and the cell site 12. The booster 16 also includes a plurality of cell site to mobile communication paths 32-40 for transmitting five channels of control or audio between cell site 12 and the mobile M.

Signals from the cell site 12 transmitted to the booster 16 and detected at antenna 18 pass through duplexer 50 and enter multi-coupler 52. The multi-coupler 52 provides RF amplification of low level signals. Output from the multi-coupler 52, on lines 52a-e, provides input to the communication paths 32-40 which, as discussed subsequently, are implemented as intermediate frequency transmission paths.

Output from each of the paths 32-40 is amplified in RF power output amplifiers 54a-e. Amplified outputs from the amplifiers 54a-e are combined in a high power lossless combiner 56. Alternatively, separate antennas may be employed for each RF power amplifier, or a very high power linear amplifier using distortion cancelling techniques may be used with a single antenna. The output from the combiner 56, on a single line 56a, is coupled to a duplexer 58. Output from the duplexer 58 is then transmitted via the antenna 20 to the mobile M.

Incoming signals received from the mobile unit M at the antenna 20 are coupled via the duplexer 58 to multi-coupler 60. Outputs from the multi-coupler 60 drive the intermediate frequency communication paths 22-30. Outputs from the paths 22-30 are combined in a five way combiner 62. The combined output from the five way combiner 62 is amplified in the linear amplifier 64. The output from the amplifier 64 provides an input to the duplexer 50.

Output from the duplexer 50 is coupled via the directional antenna 18 to the cell site 12. The intermediate frequency communication paths 22-30 and 32-40 operate under control of a stored program control unit 66. Each of the paths 22-30 is identical. Similarly, each of the paths 32-40 is identical.

The booster 16 provides for the use of individual channel filters, implemented as the intermediate frequency paths such as 22 or 32. The intermediate frequency paths 22-30 and 32-40 represent a subset of a total number of channels which would normally be available from the cell site 12 assuming that the mobile M would be in an area of good reception. The boosted control channel and voice channels may be transmitted between the booster 16 and the cell site 12 or between the booster 16 and the mobile M on the same frequencies as received (F1-F1 mode of operation) or on different frequencies (F1-F2 mode of operation). Frequency translation alleviates problems of signal cancellation on the periphery of the boosted area. This also permits the use of greater gain through the transmission paths 22-30 or 32-40.

Operation of the booster 16 is based on the fact that the closer the mobile M is to the cellular booster 16 the more likely that it will be in the vicinity where direct coverage from the cell site 12 is marginal. Mobiles near the cellular booster 16 will have higher signal levels then mobiles in other places. This provides a means for determining which channels require repeating. Accordingly, coverage in the problem area is achieved by placing the available individual communication paths on those channels associated with the strongest of the active mobile signals.

The cellular booster 16 scans all of the available donor cell channels in a brief period of time, less then a couple of seconds. For each scanned channel a running average is updated of the signals that exceed a minimum threshold. An average of I out J readings exceeding this threshold provides a readily implementable test which can be used to determine which signals should be repeated and which signals should be dropped.

Mobiles that are driving into the area served by the booster 16 are monitored for several scans thereof to determine the signal level trend before boosting or retransmission of the mobile is attempted. As a result, erroneous boosting of channels due to momentarily strong mobile signals can be minimized.

Subscribers approaching the coverage area of the booster 16 are generally picked up within five or ten seconds. The subscribers are dropped upon leaving the area due to either falling below a predetermined minimum threshold or being voted out by other stronger mobile system signals closer to the booster 16.

A specific transmission path can be provided for the control channel of the cell site 12 to allow mobile call originations or terminations to be completed for those mobiles which are not currently active but which are in the vicinity of the booster 16. The transmission path for the control channel may be purposely offset to provide F1-F2 repeater operation. For the same mobiles, an "action" threshold level is provided to allow quick response in setting up a boosted transmission path for a new call. This "action" threshold level is generally higher than the minimum threshold level. A signal exceeding this level is flagged for immediate action at the end of a scan. The mobile will transmit on the channel assigned by the cell site 12 for a maximum of five seconds without the presence of a correct supervisory audio tone being detected by the booster 16.

If the mobile signal exceeds the "action" threshold, a boosted transmission path will be placed on that channel within a couple of seconds. If the signal is below that threshold but above the minimum threshold, a boosted transmission path will be assigned within five seconds or so.

Weaker mobile signals that approach the minimum threshold will generally be in an area where some coverage is provided directly from the cell site 12. This provides adequate time for the booster 16 to average the readings and determine that a new channel is to be boosted.

The communication path 22 is identical to paths 24-30 and paths 32-40. A description of the structure of path 22 is thus applicable to the paths 24-40.

Figure 2A:
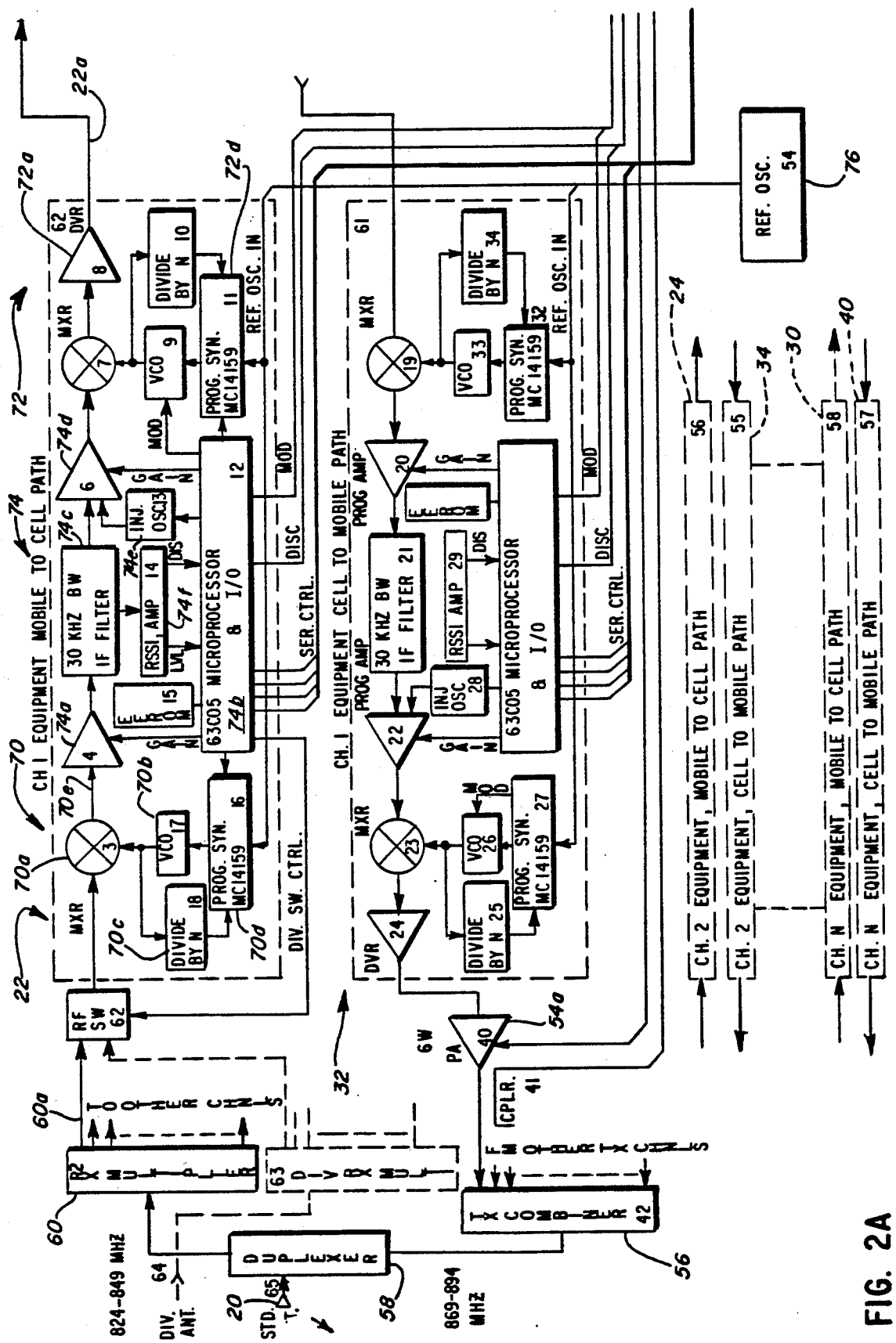
FIGS. 2A and 2B taken together are a more detailed schematic diagram of the booster of FIG. 1.
Figure 2B:
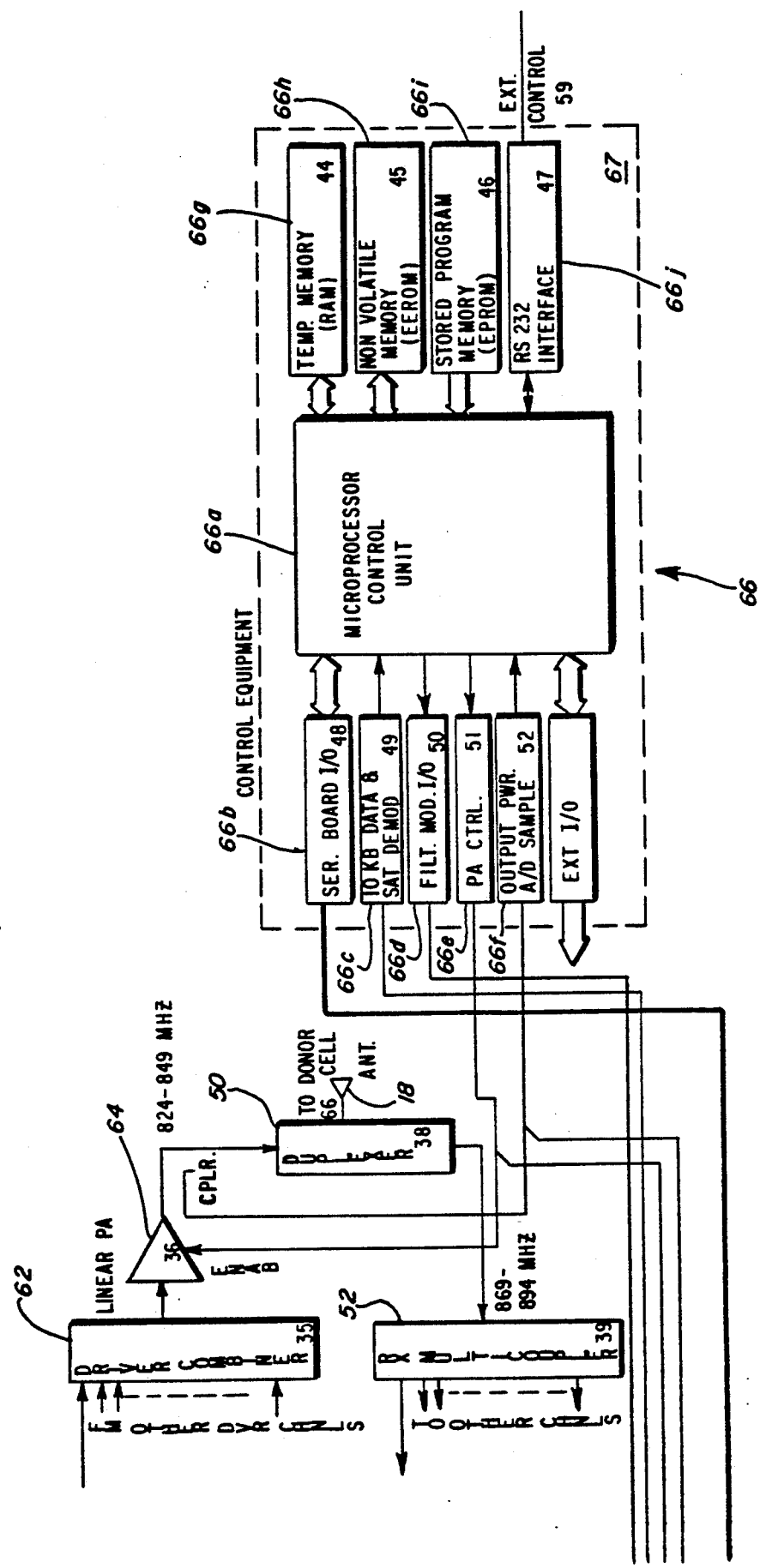

With respect to FIGS. 2A and 2B, the path 22 includes input circuitry 70 and output circuitry 72. Input to the path 22 on a line 60a from the multiplexer 60 is a modulated signal in the 824 to 849 MHz range. The circuitry 70 converts that high frequency input on the line 60a to an intermediate frequency in a range on the order of 70 MHz for the purpose of controllably amplifying that signal for retransmission to the cell site 12.

The circuitry 70 includes a mixer 70a. The mixer 70a can be a model SRA-1 marketed by Mini-Circuits Corp., or similar. The mixer 70a is controlled by a local voltage controlled oscillator 70b which provides a local oscillator input frequency for conversion of the input signal on the line 60a to the 70 MHz intermediate frequency. Output from the voltage controlled oscillator 70b also provides an input to divide by N circuitry 70c. The divide by N circuitry 70c is a frequency divider element which provides selected signals from the voltage controlled oscillator 70b to a frequency synthesizer 70d. The frequency synthesizer 70d can be implemented employing a MC14159 prescaler circuit in addition to other commonly used components such as voltage-controlled RF oscillators and stable reference oscillator sources.

Output from the mixer circuitry 70 on a line 70e at the 70 MHz intermediate frequency provides electrical input to the intermediate frequency circuitry 74. The intermediate frequency circuitry 74 includes a gain-programmable intermediate frequency amplifier 74a. The amplifier 74a is programmable and its gain is set by microprocessor 74b. Microprocessor 74b also provides control input signals to the synthesizer 70d.

Output from the programmable amplifier 74a is filtered in a 30 KHz bandwidth intermediate frequency filter 74c. The filter 74c provides adjacent channel rejection to signals 30 KHz or more away from the signal being repeated on the path 22.

Output from the intermediate frequency filter 74c drives programmable amplifier 74d which is identical to the amplifier 74a. Amplifiers 74a and 74d can be Avantek 0885 or similar. The 30 KHz bandwidth intermediate frequency filter 74c can be composed of several individual two-pole crystal filters such as NDK 70N20C.

Programmable amplifier 74d also receives input from an injection oscillator 74e. The oscillator 74e is a stable, crystal oscillator at the 70 MHz intermediate frequency. The oscillator 74e is used to inject an intermediate frequency signal into the programmable amplifier 74d when data is to be transmitted. The injection oscillator 74e operates under microprocessor 74b.

Signal strength amplifier 74f is an IF amplifier which operates at a frequency lower than that of the filter 74c. This amplifier is a received signal strength indicator (RSSI). It provides both discriminator audio output and an analog DC signal output which is proportional to the radio frequency signal level input. The signal strength amplifier 74f provides its outputs to the microprocessor 74b and contains its own local oscillator for conversion to the lower intermediate frequency.

Intermediate frequency circuitry 72 includes a driver amplifier 72a. The amplifier 72a is a radio frequency amplifier used to provide sufficient signal level in the 824 to 849 MHz range to drive the linear output amplifier 64.

A reference oscillator 76 provides input to the two frequency synthesizers 70d and 72d. As a result of using two synthesizers, 70d and 72d which receive signals from the common reference oscillator 76, any offset in the input carrier frequency on the line 60a of the signal to be boosted will be translated to the output frequency on the line 22a. The transceiver in the mobile or the transceiver in the cell site 12 controls the basic accuracy of the boosted signal in this configuration.

The use of two frequency synthesizers 70d and 72d permits the offset of the control channel to another nearby control channel, as well as the offsetting of the voice channels. As a result, the problem of excessive data bit error rates when signal levels from the signal source in the mobile M and the output of the booster 16 are at the same or nearly the same signal levels at the target receiver at the cell site 12 can be minimized.

The above comments also apply with respect to the transmission paths 32 through 40 which are used for the purpose of boosting signals from the cell site 12 to the mobile M.

The stored program control unit 66 includes an 8031 Intel microprocessor 66a. The processor 66a provides overall control for the booster 16. It communicates with the other circuitry in the booster 16 via a serial board 66b. The control unit 66 also includes a 10 kilobit data demodulator and a 6 kHZ supervisory audio tone (SAT) demodulator 66c. The demodulator 66c includes circuitry for decoding the 10 kilobite data stream which is utilized in the cellular system and for measuring which of the SAT three 6 kHZ frequencies are being transponded by the cellular mobile unit such as the mobile unit M.

The control unit 66 also includes a filter modulator unit 66d. The unit 66d includes a low-pass filter and gate for sending 10 KB/Sec data in the standard cellular format for frequency modulation of one of the paths in the booster 16.

The control unit 66 also includes a power amplifier control unit 66e. The power amplifier control unit 66e has outputs for enabling or disenabling the RF power amplifiers such as the amplifiers 54a-e and the amplifier 64. The power amplifier control unit 66e also includes an input for sensing the temperature of each of the power amplifiers.

The control unit 66 also includes an output power sampling unit 66f. The sampling unit 66f converts analog DC voltage which is proportional to the radio frequency output power of the amplifiers 54a-e and 64 to a digital word for processing by the control unit 66.

The control unit 66 also includes a random access memory module 66g, an electrically erasable read only memory module 66h for nonvolatile storage of alterable information and an electrically programmable read only memory module 66i for program storage. An RS232 interface 66j is also provided for connection of a computer terminal or a test cellular mobile to the booster 16.

The control unit 66 is utilized for maintaining signal level history for processing purposes as well as for controlling the frequency synthesizers, such as the synthesizers 70d and 72d. It is also used for setting the signal gain through each path as well as for measuring the received signal levels on each channel and for carrying out diagnostic and parameter setting functions.

A flow diagram, FIGS. 3A-3D, describes the sequence of events that takes place in determining candidate channels for boosting. All the channels of the cell site 12 are scanned. If the measured signal level from a mobile on any of the cell site channels exceeds a minimum preset threshold and also has the correct SAT frequency, that channel number and its signal level are recorded. A running history of the signal levels of the various mobiles that are active is maintained in a table. At the end of each channel-set scan the data in the table are analyzed to rank the signals by level.

If there are more candidate channel readings than there are available booster channels, then the "n" highest readings from the ranking are selected. The "n" booster set is then placed on the channels associated with the "n" highest readings.

The cellular booster scans all of the donor cell channels in less than a couple of seconds. For each channel, it updates a running average of the signals that exceed the minimum threshold (an average of I out of J readings exceeding this threshold). Thus, mobiles that are driven into the area are monitored for several scans to determine the signal level trend before an actual retransmission of the mobile is attempted. In this manner, erroneous placement of repeater channels due to momentarily strong mobile signals is minimized. Thus, subscribers approaching the problem coverage area are generally picked up within 5 or 10 seconds, and are dropped upon leaving the area due to either falling below the minimum threshold or being "voted" out by other stronger mobile signals.

A transmission path is provided on the donor cell control channel to allow mobile call originations or call terminations to be completed for those mobiles that are in the poor coverage area but are not currently active. For these mobiles, an "Action" threshold level is provided to allow quick response in setting up a transmission path for the new call. This "Action" threshold level is generally higher than the minimum threshold level. A signal exceeding this level is flagged for immediate action at the end of a scan.

The mobile will transmit on the channel assigned by the donor cell site for a maximum of 5 seconds without the presence of the correct SAT before it disconnects the call. If the mobile signal exceeds the "Action" threshold, a transmission path will be placed on that channel within a couple of seconds. If the signal is below the threshold but well above the minimum threshold, then a repeater channel will be assigned within 5 seconds or so. Weaker mobile signals that approach the minimum threshold will generally be in an area where some coverage is provided directly from the cell site, thus allowing adequate time for the cellular booster to average the readings and determine that the new channel is to be boosted.

A parallel approach to assure that all new call attempts through the boosted control channel are connected through a boosted voice channel includes decoding the new channel assignments that are contained in the cell site control channel data stream. The signal level of the mobile responding to the channel assignment can thus be measured immediately, and its signal level compared with the current "running average" signal level set of other boosted channels. A transmission path can thus be assigned immediately unless all paths are already assigned to other stronger signals.

This approach is based on the premise that enough transmission paths will be available to handle the expected peak subscriber load of the problem coverage area. A grade of service factor will be present where peak loads with a lot of nearby mobiles may result in a denial of service to other mobiles which may need boosting. The cellular operator may accept this level of service. The level of service may be improved by adding additional transmission paths in much the same manner as establishing a grade of service with a standard cell site.

A degree of hysteris is provided to prevent mobiles from needlessly being dropped as they are moving about in the problem area. A new criteria (I out of K rather than I out of J readings, where K is larger than J) is applied to those channels currently being boosted. Thus, a larger number of readings below the minimum threshold is allowed before the call is dropped.

The flow diagram of FIGS. 3A-3D also illustrates a method for placing the mobiles on voice channels that are different than those assigned by the donor cell. This represents an F1-F2 mode of operation. This accomplished by sending the mobile a "handoff" message to place the mobile on a new unused voice channel. The information transmitted from the cell site is thus translated to the new channel on which the mobile has been placed. Transmissions from the mobile are translated back to the correct channel for reception by the cell site. If the mobile is in an area where the signal from the cell site is about the same level or is stronger than the signal from the booster, then the handoff will not be accomplished. This is desirable since signals from the cell site are strong enough to allow continued direct communication.

A mobile that is communicating with a cell site through the booster (operating in the F1-F2 mode) will be handed back to the original donor cell channel assignment as it drives out of the range of the booster's coverage area. This will allow the cell system to continue processing the call via normal handoffs if the mobile requires further attention.

With respect to FIGS. 3A-3D, a mode of operating the booster 16 will first be described wherein the incoming signal is retransmitted at the same frequency as received (F1-F1 mode). The booster can also be operated in the F1-F2 mode as described in FIG. 3D. With respect to the flow diagram, the booster 16 is first manually initialized in a step 100. Initialization includes specifying the total number of channels M available at the cell site 12. Next the number of transmission paths N, available in the booster 16, is specified. For the exemplary embodiment a total of 5 transmission paths are available each way. Next a minimum threshold level of the incoming signal from either the cell site 12 or the mobile M is specified. This threshold can be specified in decibels with respect to milliwatts. Signals above this minimum level are candidates for boosting or repeating. Signals below this level are disregarded.

An "action" level threshold is then specified. The "action" level threshold is higher than the minimum level threshold and is used to differentiate those mobiles which are quite close to the booster 16 and should be given priority service from those which are further away and might be receiving adequate service directly from the cell site 12.

Next the number of measurements J for each channel is specified for purposes of maintaining a running history of sensed incoming signals. A minimum number of acceptable measurements I is also specified. In operation there must be a minimum of at least I signals measured out of a total of J signals measured which are above the previously set minimum threshold in order to initiate signal boosting.

A number of acceptable measurements, K, is also specified at initialization. The number K is used for the purpose of determining whether or not to continue to enhance signals to and from a mobile unit M. The value of K is the same as or greater than the value of J.

Subsequent to the initialization step the booster in a step 102 initiates scanning by examining the first channel to determine if there are any mobiles active thereon. If an incoming signal from a mobile unit, such as the unit M, is detected, in a step 104, the booster 16 determines whether or not the correct supervisory audio tone (SAT) has been received. The SAT determines whether or not a signal being sensed is associated with the cell site 12. Signals not associated with the cell site 12 are not boosted.

Assuming a correct SAT signal has been detected, in a subsequent step 106 the booster 16 determines whether or not the channel currently being scanned is actively being boosted. If so, a five second SAT timer is initiated in a step 108. The SAT timer provides a five second delay which upon expiration, if this repeater channel is active, may permit the channel to be dropped. This would correspond to a signal which was properly being boosted initially and which at some point ceased to have the SAT associated with the cell site 12.

In a step 110 the incoming signal is compared to the preset minimum threshold to determine whether or not that threshold is exceeded. If that threshold is not exceeded then no boosting of that signal is attempted. If the signal does exceed the minimum prespecified threshold then boosting of that signal may be attempted.

In a subsequent step 112, the incoming signal is compared to the previously set "action" threshold level to determine whether or not the mobile unit M is exceedingly close to the booster 16. If the incoming signal exceeds the "action" level threshold in a step 114, the repeater checks to determine whether or not the incoming signal is already being boosted. If so, it goes on to check the next channel in a step 116.

If the signal is not already being boosted, in a step 118 the last J readings for this channel are set to the current value which has just been read in the step 112. By setting the last J values in the step 118 to the most recently read values, the signal becomes a very high probability candidate for being immediately repeated. This corresponds to the mobile unit M being quite close to the booster 16 and usually in a region wherein the cell site 12 provides inadequate service.

In the event that the currently sensed signal does not exceed the "action" level threshold in the step 112, that value is recorded along with the channel number on a stack in a step 120. In a step 122 the booster 16 determines whether or not this channel is currently being boosted. If not in a step 124 it determines whether or not the last I out of J readings associated with the present channel have been above the predetermined minimum threshold. If not, the signal is not a candidate for being boosted.

If the last I out of J readings do exceed the previously specified minimum threshold, then the signal is a candidate for being boosted. The average value of the last I readings along with channel number is recorded in a step 126. The next channel is then tested in a similar fashion until all of the channels associated with the cell site 12 has been examined.

In the step 122, if the signal is currently being boosted, in a step 128 the booster 16 determines whether or not the last I out of K readings exceeded the predetermined minimum threshold. If not, in a step 130 boosting of this signal ceases and the channel identification is removed from a table identifying those channels being boosted. If on the other hand in the step 128 the last I out of K readings for the signal are above the predetermined minimum threshold then the signal continues to be boosted and the booster goes on to the step 116.

Figure 3A:
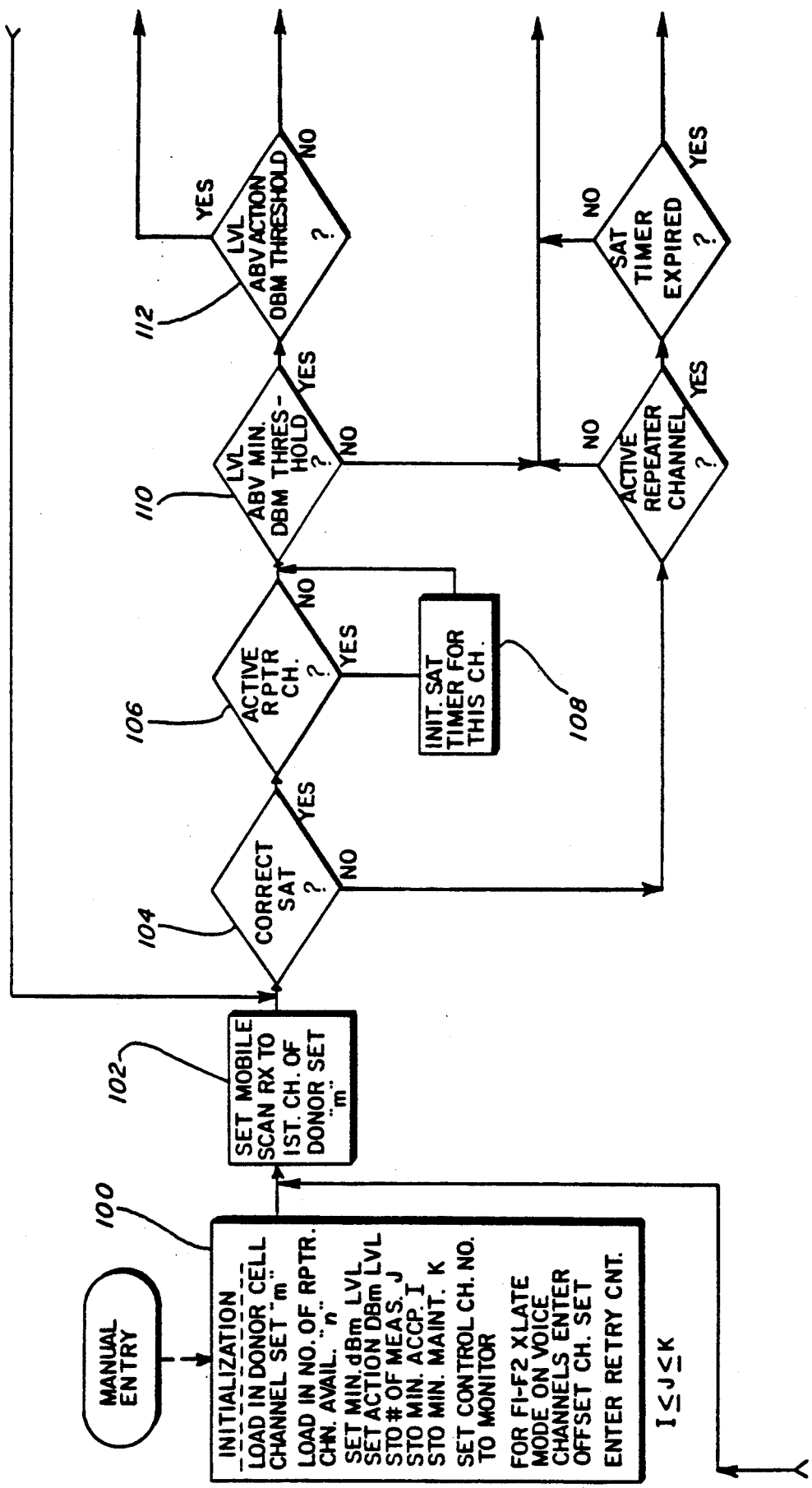
FIGS. 3A through 3D taken together are a flow chart illustrating various modes of operation of the booster of FIG. 1.
Figure 3B:
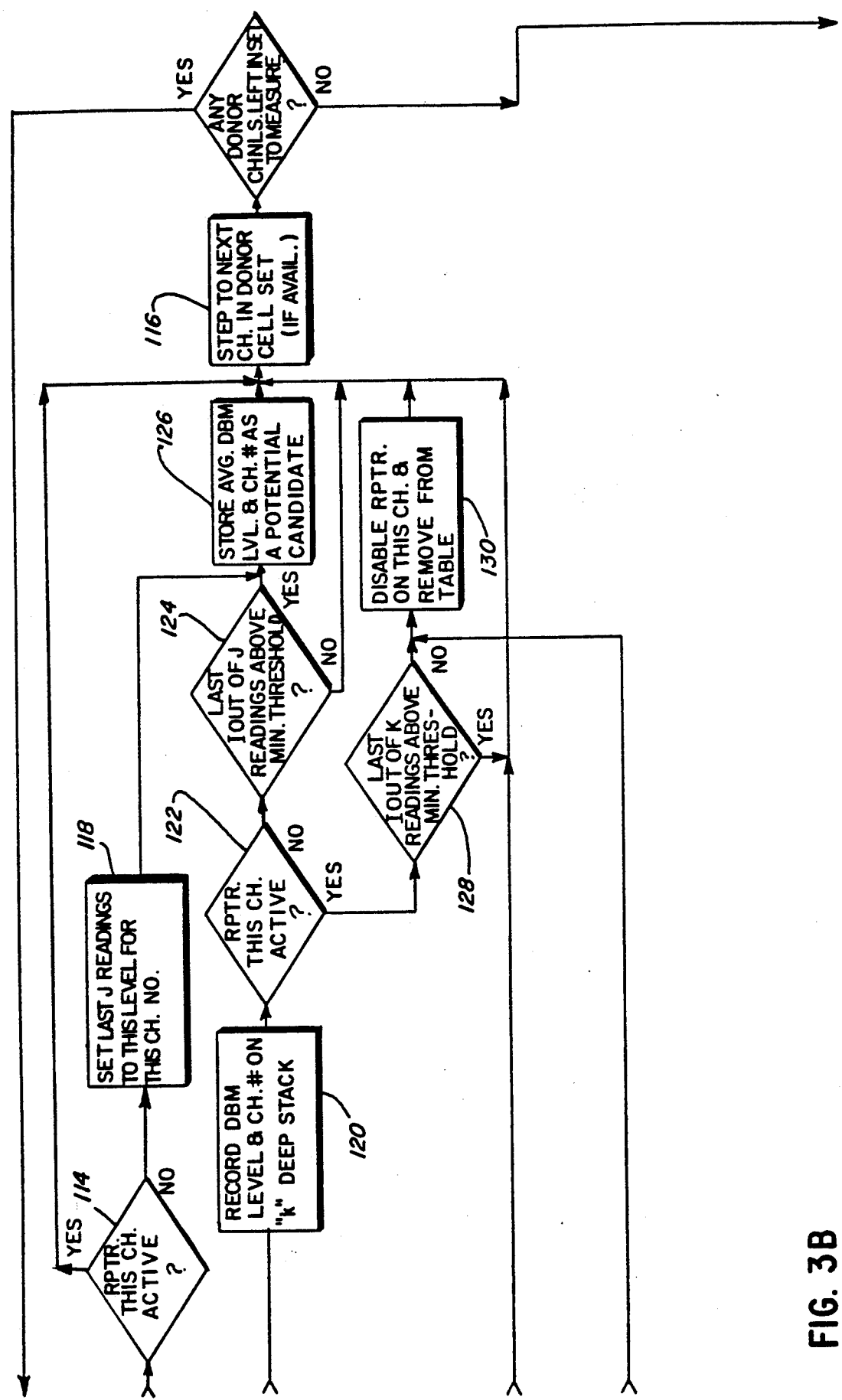
Figure 3C:
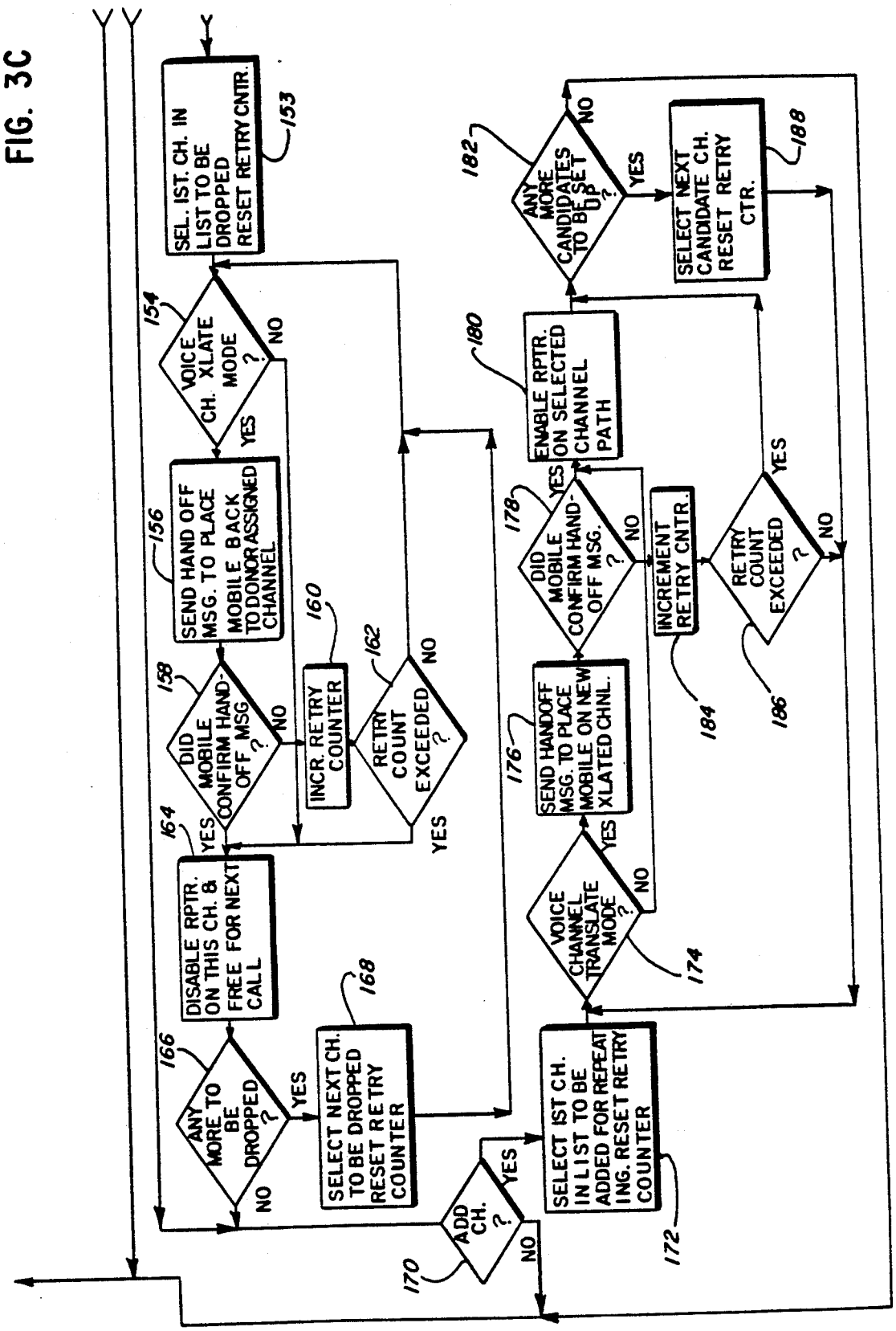
Figure 3D:
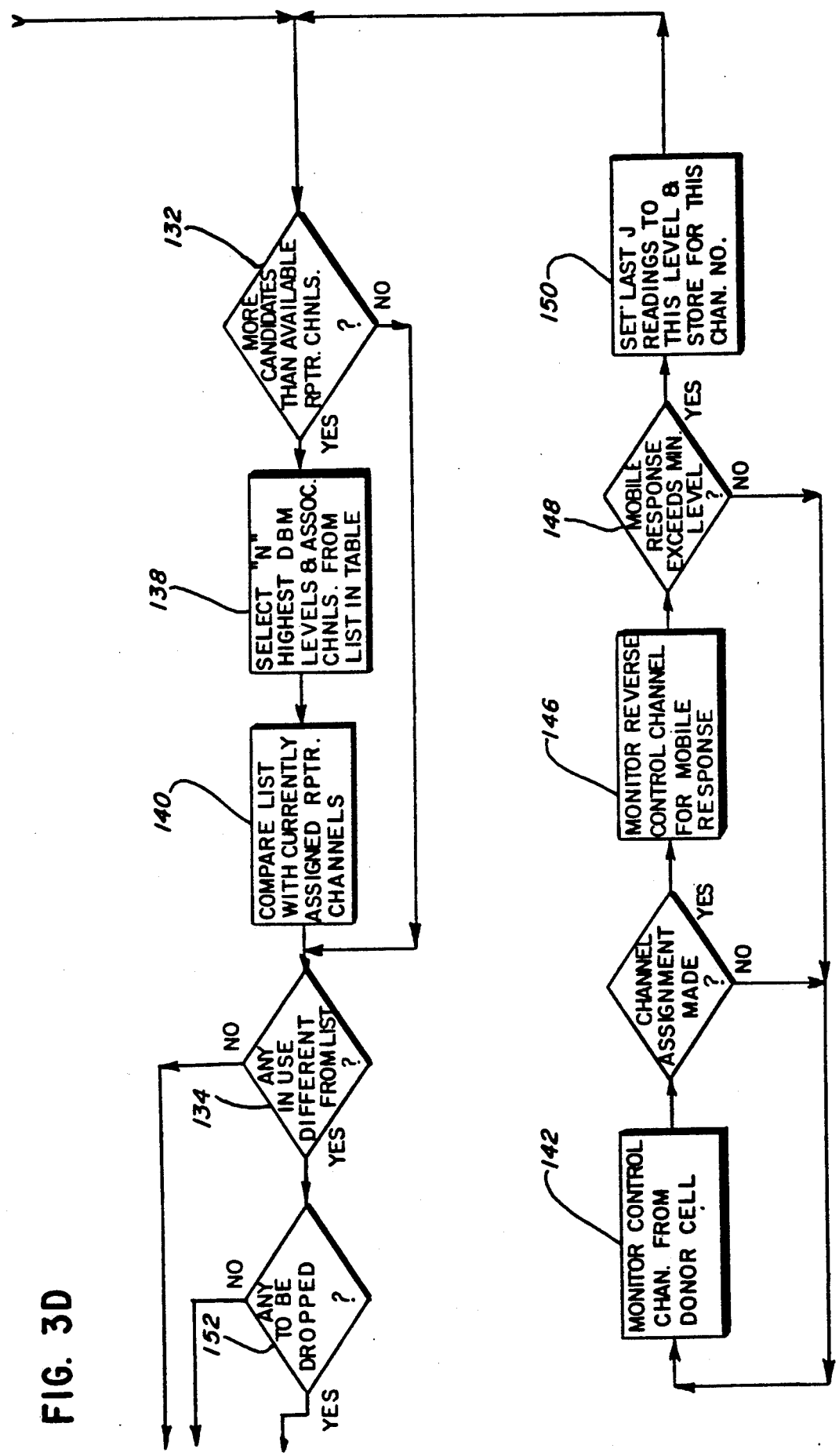

With respect to FIG. 3D, a parallel process wherein the signal level information can be reapidly determined is accomplished by continuously monitoring in a step 142 the control channel from the donor cell. Whenever a channel assignment is monitored from the donor cell, the signal level from the intended mobile is measured in a step 146. If in a step 148 the mobile response to the channel assignment exceeds the minimum selected threshold level, then the channel table is updated in a step 150 to immediately add this channel t the candidate list. The minimum threshold level can be the same as the "Action" level described earlier. It could also be a separately programmed level that either is provided by the operator or determined on a dynamic basis from the table of received signal levels that are being received by the active repeater channels. This operation is analogous to the steps 118 and 126 described earlier, and is used in conjunction with these two steps to continuously update the candidate channel list.

Once all of the channels associatable with the cell site 12 have been measured, the booster determines in a step 132 whether or not there are more candidates for boosting than there are available booster transmission paths. If not, the booster 16 tests in a step 134 to determine whether or not the list of potential signals to be boosted is the same as or different from the list of those currently being boosted. If not, all of the channels continue to be repeated and the booster 16 returns to the step 102.

In the event that in the step 132 the booster 16 determines that there are more candidates available for enhancement then there are available booster transmission paths, in a step 138, a subset of the candidates available for repeating is selected. In a step 140 the list of potential candidates for boosting is compared with the currently assigned repeater channels. If there is a difference noted in the step 134, then a process of adding and/or dropping channels will take place, as illustrated by FIG. 3C.

The list of candidate channels is examined in a step 152 to first determine if any channels are to be dropped. This is necessary to release communication paths for assignment to new channels. If any are to be dropped, the first channel in the list to be dropped is selected in a step 153. Next, a determination is made in a step 154 to establish if this channel that is currently being repeated is a translated channel (F1-F2), or a same-frequency boosted channel (F1-F1). If it is not a translated (F1-F2) channel, then the channel repeater is immediately disabled in a step 164 to free up the channel equipment for a new call.

If it is a translated channel that is to be dropped, a hand-off message is first sent to the mobile in a step 156 to place the mobile back on the same channel as the donor cell (i.e., back to an F1-F1 mode). A test is made in a step 158 to determine whether the mobile acknowledges the hand-off message. If the mobile did not acknowledge the hand-off message, a retry counter is incremented in a step 160. The hand-off message is repeated if the retry count has not been exceeded in a step 162. Either acknowledgment of the hand-off message or exceeding the retry count will cause the repeater to be disabled for this channel. If the mobile does not acknowledge the hand-off message, then it is beyond the range of the booster.

After the channel has been dropped, in step 166 a check is made to determine if any other channels are to be dropped. If more channels remain, the retry counter is reset and the steps 156 through 164 are repeated as before to release transmission paths no longer required for signal boosting.

If there are no further channels to be dropped as determined in the step 166, or if there were no channels initially to be dropped as determined in the step 152, then a test is made in a step 170 to determine whether any channels are to be added. If not, then the booster returns to the step 102. The parallel monitoring of new channel assignments in steps 142 through 150 continues to determine and update new candidates for channel assignment.

If in the step 170 a determination is made that new channels are to be added, then the first candidate channel that is to be added is selected in a step 172. Next, a determination is made in a step 174 to establish if this channel is to be a translated channel (F1-F2), or a same-frequency boosted channel (F1-F1). If it is not to be a translated (F1-F2) channel, then an available channel repeater, communication path, is immediately assigned to this channel in a step 180.

Of the voice channel is to be translated, then a hand-off message containing the new channel assignment is sent to the mobile on the original channel to which the mobile has been assigned by the donor cell, in a step 176. If the mobile confirms the hand-off message on the newly assigned channel, in a step 178, then the channel equipment associated with the call is enabled in the F1-F2 frequency translation mode, in a step 180.

If the mobile did not acknowledge the hand-off message, then a retry counter is incremented in a step 184. The hand-off to the target mobile is then retransmitted. If the mobile fails to acknowledge the hand-off message after "N" retries as in a step 186, then the repeater equipment is not enabled for this candidate.

A determination is then made in a step 182 whether any other candidates are to be processed. If so, then the next channel is selected and the retry counter is reset in a step 188. The channel equipment is set up as previously described for steps 174 through 180 and 184 through 186. After all channel candidates have been processed, then the process returns to the step 102. Monitoring of new channel assignments in steps 142 through 150 continues in parallel with the updating and determination of new candidates for channel assignment.

In addition to the previously noted problem of inadequate coverage within a cell, another problem of inadequate cell coverage along selected geographical corridors can be addressed by boosters in accordance with the present invention. Such inadequate coverage can develop along heavily traveled highways linking two adjacent population centers. Such highways carry a great deal of transient traffic which would use cellular mobile service while in transit if it is available.

Inadequate coverage along such corridors often results from a failure to install cell sites adjacent to or along the corridors. However, such corridors may no carry enough cellular mobile message traffic to justify the expense of one or more cell sites primarily to provide service to the adjacent corridor.

A corridor extension system can be implemented using a plurality of boosters of the type of such boosters will provide highly directive coverage, cost effectively, along such a corridor.

FIG. 4 is an over-all diagram of a cell extender system 200. Frequencies are indicated on FIG. 4 for a voice channel downlink and a voice channel uplink. A frequency indicated by a prime, "'" off-set from an unprimed corresponding frequency by 45 MHz.

The system 200 includes a plurality 202 of boosters 204-212 that extend the coverage of the cells by repeating the downlink signals from the cell site S to the mobile M and the uplink signals from the mobile M to the cell site S. The repeated signals are relayed from booster to booster using two sets of frequencies that are not part of the mobile frequency set that is in use. Logic in the booster based upon received signal levels determines whether the booster repeats the mobile frequencies or the booster frequencies.

Regardless of how many boosters 204-212 are in series, the mobile M will always use a single set of frequencies for voice or audio channel use when functioning through any of the boosters. This has the advantage that no hand-off is necessary in the mobile as it moves from the coverage of one booster to another booster. Hand-off is required when the mobile moves from the booster coverage area to the cell-site coverage area because the cell site S uses another set of frequencies for the voice channels.

The cell site S dictates which voice channels the mobile is to operate on during the initial stages of the call setup. In a normal mode of operation, the booster that is processing a call setup to or from a mobile immediately sends a hand-off message to that mobile to place it on a channel in the f2 set. The booster closest to the donor site S then translates the mobile frequency back to the original channel in the f1 frequency set that was assigned by the cell site S. in an alternate mode of operation, the hand-off step described above may be bypassed by incorporating the f2 frequency set in the channel assignment list at cell site S, while maintaining the f1 frequency set for actual transmission and reception of voice messages to the nearest booster in the corridor. In either case, a single set of frequencies (the f2 set) for mobile conversations in the booster within the chain in conjunction with the stored program logic contained within the boosters causes only the booster that has a usable signal from the mobile and is closest to the cell site S to communicate with the mobile on a channel in the f2 frequency set.

The control channel requires two or more different frequencies because the down-link control channel must be repeated at each booster to provide continuous coverage throughout the booster corridor area. If omnidirectional antennas are used for booster transmissions to and from the mobile, then a third set of frequencies may be necessary to preclude interference between even or odd-numbered boosters along the corridor.

Use of directional antennas can allow just two frequency sets to be used for control channel transmission. The control channel signal from cell site S can thus be repeated on alternate channels at each booster in the chain.

The booster logic for relaying the control channel uplink signal is similar to the voice channel logic. The booster will relay the mobile uplink signal if it is receiving a usable signal. If not, then the uplink signal from the down-stream booster if it is present, will be retransmitted. Otherwise, the control channel uplink booster is off.

The frequency allocation for the system 200 requires four sets of frequencies and in some cases one extra control channel frequency, includes the frequency set for the cell site. There is a one-for-one relationship between the frequencies in one set and the frequencies in another set. The table below shows an example for a four booster extender system.

TABLE I

| | FREQUENCY ALLOCATION | |
|---|---|---|
| | CONTROL CHANNEL | VOICE CHANNEL |
| DOWNLINK | | |
| CELL-SITE | | |
| XMIT | F1 | f1 |
| BOOSTER 204 | | |
| RCV | F1 | f1 |

TABLE I-continued
FREQUENCY ALLOCATION

|  | CONTROL CHANNEL | VOICE CHANNEL |
|---|---|---|
| XMIT | F2 | f2 or f3 |
| BOOSTER 206 | | |
| RCV | F2 | f3 |
| XMIT | F1 | f2 or f4 |
| BOOSTER 208 | | |
| RCV | F1 | f4 |
| XMIT | F2 | f2 or f3 |
| BOOSTER 210 | | |
| RCV | F2 | f3 |
| XMIT | F1 | f2 |
| UPLINK | | |
| BOOSTER 210 | | |
| RCV | F1' | f2' |
| XMIT | F2' | f3' |
| BOOSTER 208 | | |
| RCV | F2' | f2' or f3' |
| XMIT | F1' | f4' |
| BOOSTER 206 | | |
| RCV | F1' | f2' or f4' |
| XMIT | F2' | f3' |
| BOOSTER 204 | | |
| RCV | F2' | f2' or f3' |
| XMIT | F1' | f1' |

Table II illustrates the operation of the system 200 when calls are originated while the mobile M is in the coverage area of the system 200. The mobile M remains on its initially assigned voice frequency as it moves from one coverage area to another such as from booster 206 to booster 208.

TABLE II
RADIO CALL SEQUENCE AND FREQUENCY PLAN FOR A FOUR BOOSTER SYSTEM

| CELL SITES | | | | | | |
|---|---|---|---|---|---|---|
| UPLINK | R | B(F1) | | D(f1) | F(f1) | |
| DOWNLINK | X | A(F1) | C(F1) | | E(f1) | F(f1) |
| BOOSTER 204 | | | | | | |
| UPLINK | X | B(F1) | | D(f1) | F(f1) | |
|  | R | B(F3) | | D(f3) | F(f3) | |
| DOWNLINK | R | A(F1) | C(F1) | | E(f1) | F(f1) |
|  | X | A(F2) | C(F2) | | E(F3) | F(f3) |
| BOOSTER 206 | | | | | | |
| UPLINK | X | B(F3) | | D(f3) | F(f3) | |
|  | R | B(F4) | | D(f4) | F(f4) | |
| DOWNLINK | R | A(F2) | C(F2) | | E(f3) | F(f3) |
|  | X | A(F1) | C(F1) | | E(f4) | F(f4) |
| BOOSTER 208 | | | | | | |
| UPLINK | X | B(F4) | | D(f4) | F(f4) | |
|  | R | B(F2) | | D(f2) | F(f3) | |
| DOWNLINK | R | A(F1) | C(F1) | | E(f4) | F(f4) |
|  | X | A(F2) | C(F2) | | E(f2) | F(f3) |
| BOOSTER 210 | | | | | | |
| UPLINK | X | | | D(f3) | F(f3) | |
|  | R | | | D(f2) | F(f2) | |
| DOWNLINK | R | A(F2) | C(F2) | | | F(f3) |
|  | X | A(F1) | C(F1) | | | F(f2) |
| MOBILE M | | | | | | |
| UPLINK | X | B(F2) | | D(f2) | F(f2) | |
| DOWNLINK | R | A(F2) | | | E(F2) | |

(Fx) = CONTROL CHANNEL IN FREQUENCY SET x
(fx) = VOICE CHANNEL IN FREQUENCY SET x

MOBILE ORIGINATION STEPS

A: CELL SITE S TRANSMITS A CONTINUOUS STREAM OF CONTROL DATA ON THE DOWNLINK THAT IS REPEATED AT EACH BOOSTER SITE, ADJACENT SITES USE DIFFERENT FREQUENCIES. MOBILE M SCANS AND LOCKS ONTO THE STRONGEST SIGNAL.

B: MOBILE THAT IS ORIGINATING A CALL TRANSMITS THE REQUEST ON CONTROL CHANNEL UPLINK.

C: CELL SITE S RECEIVES A REQUEST AND ASSIGNS A NON-BUSY VOICE CHANNEL IN THE f2 FREQUENCY SET AND TRANSMITS THE ASSIGNMENT ON THE CONTROL CHANNEL DOWNLINK.

D: MOBILE M RECEIVES CHANNEL ASSIGNMENT, SWITCHES TO THE ASSIGNED VOICE CHANNEL, AND TRANSMITS A SAT TONE. IF A FREQUENCY OFFSET PLAN IS USED AT THE DONOR CELL SITE TO ASSIGN THE MOBILE TO THE CORRECT CHANNEL IN THE f2 SET, THEN BOOSTER 208 REPEATS THE SIGNAL RECEIVED DIRECTLY FROM THE MOBILE M. OTHERWISE, BOOSTER 208 FIRST SENDS A HAND-OFF MESSAGE TO PLACE THE MOBILE ON A CHANNEL IN THE f2 SET BEFORE REPEATING THE MOBILE SIGNALS BACK TO THE DONOR CELL SITE.

E: CELL SITE S RECEIVES THE SAT TONE ON THE ASSIGNED VOICE CHANNEL AND COMPLETES THE RADIO VOICE CHANNEL CONNECTION.

BOOSTER TO BOOSTER HAND-OFF STEPS

F: MOBILE M MOVES OUT-OF-RANGE OF BOOSTER 208 INTO THE BOOSTER 210 COVERAGE AREA. BOOSTER 208 SWITCHES THE RECEIVED UPLINK FREQUENCY TO THE UPLINK SIGNAL (f3 SET) FROM BOOSTER 210 AND SWITCHES THE DOWNLINK TRANSMIT FREQUENCY TO THE f3 FREQUENCY. THE MOBILE M REMAINS ON THE f2 FREQUENCY VOICE CHANNEL.

LAND-LINE ORIGINATION STEPS

G: CELL SITE S PAGES MOBILE M ON THE CONTROL CHANNEL, PATH AS IN STEP A.

H: MOBILE M ACKNOWLEDGES PAGE ON UPLINK CONTROL CHANNEL, PATH AS IN STEP B.

I: CELL SITE S RECEIVES AN ACKNOWLEDGEMENT AND ASSIGNS A NOT-BUSY VOICE CHANNEL, AS IN STEP C.

J: NEXT STEPS ARE THE SAME AS STEPS D AND E, EXCEPT THAT AN ALERT MESSAGE IS SENT BY CELL SITE S TO CAUSE THE MOBILE TO RING.

Hand-off of the mobile M as it moves from a cell-site coverage area into the system 200 coverage area or as it moves out of the system 200 coverage area will require varying responses. Three approaches that may be used individually or in combination are:

A. LAST-RESORT APPROACH

When the mobile signal to Booster 204 falls below a threshold level and no uplink signal is being received from the Booster 206, a hand-off command is generated to switch the mobile M to the f1 frequency and remove the uplink signal to the cell site S. If the mobile has moved into the coverage area of the cell site S, the cell site will begin receiving the mobile uplink signal and hand-off will have been accomplished. If the cell site fails to receive the mobile, the call is lost.

When the mobile signal to the cell site causes the hand-off routine to be initiated and no other cell is a candidate for hand-off, cell site S will hand the mobile to a not-busy voice channel in the f2 frequency set. If the Booster 204 begins to repeat the mobile on the appropriate uplink f1' frequency to the cell site, hand-off will have been accomplished.

B. GAIN REDUCTION APPROACH

If the mobile signal level falls such that it is not above the minimum acceptable signal strength at any of the Boosters 204-212 but a communications path still remains, then the booster associated with the mobile will reduce its gain in the return path to the cell site S by several dB. This reduction in gain will be passed by each booster in the path, and in turn will be detected by the cell site S. If the signal drops below cell site S's threshold for minimum acceptable communications, then cell site S will initiate a hand-off request to adjacent cell sites to determine which, if any, cell can be targeted for mobile hand-off.

When the mobile moves from cell S to the system 200 coverage area, the above LAST RESORT APPROACH is used.

C. REMOTE LOCATING APPROACH

This approach establishes a two-way data path between the cell site S and the desired booster at which signal levels are to be measured. When the cell site S requests a signal level measurement on a given channel, this information is sent to the target booster which in turn will tune an unused channel receiver to the channel requested, measure the signal level, and then return the measured signal level to the cell site S. The data communications path used for this remote signal measuring technique may either be an unused cellular channel pair or may be via means external to the cellular system (i.e., microwave, telephone line, fiver optic, etc.) The information thus provided by this communications path can be used by the cell site S for determining whether mobiles should be handed to or from the booster area, or to other cell sites.

FIG. 5 is a flow diagram for each of the Boosters 204-212 that determines which uplink signal is to be transmitted on the Booster control-channel uplink: the mobile, the next Booster, or nothing. The control channel Booster always transmits the received downlink on the mobile control channel frequency. Before being transmitted to the mobile, the voice channel assignment may need to be modified to the frequencies in the Booster to the mobile set. If this is the case, the control channel logic in the Booster closest to the cell site S must modify the channel assignment because it is the only Booster that can determine which voice channels in the Booster set assigned to the system 200 are free for assignment. If all voice channels in the Booster set are busy, it must generate a busy signal to send to the mobile M.

FIG. 6 is a flow diagram for each of the Boosters 204-212 that determines which voice channel signals to repeat: the mobile, the next Booster, or nothing. If the Booster is receiving a usable mobile uplink voice channel signal, it will always repeat the mobile uplink and transmit the voice channel on the mobile downlink frequency. In the case of an uplink signal but no downlink signal, only the uplink is repeated.

A scanning receiver is used to monitor the mobile channels to detect a mobile that has moved into its coverage area after the mobile voice channel was assigned by the cell site S control channel. Voice channel logic will force the mobile M to be repeated by the Booster that is nearest the cell site S if it is receiving a usable uplink signal, even though the next Booster may be receiving a stronger signal.

The present invention is further directed to methods and apparatus for making a determination of the boosted signal coverage area. To do so a circuit for tagging, or modulating, the boosted signal such that it can be distinguished from the direct signal from the donor booster cell is implemented. A user moving about in the coverage area in question can thus determine whether the signal is being received through the booster, being received directly from the donor cell, or being received more or less equally from both sources.

Figure 7:
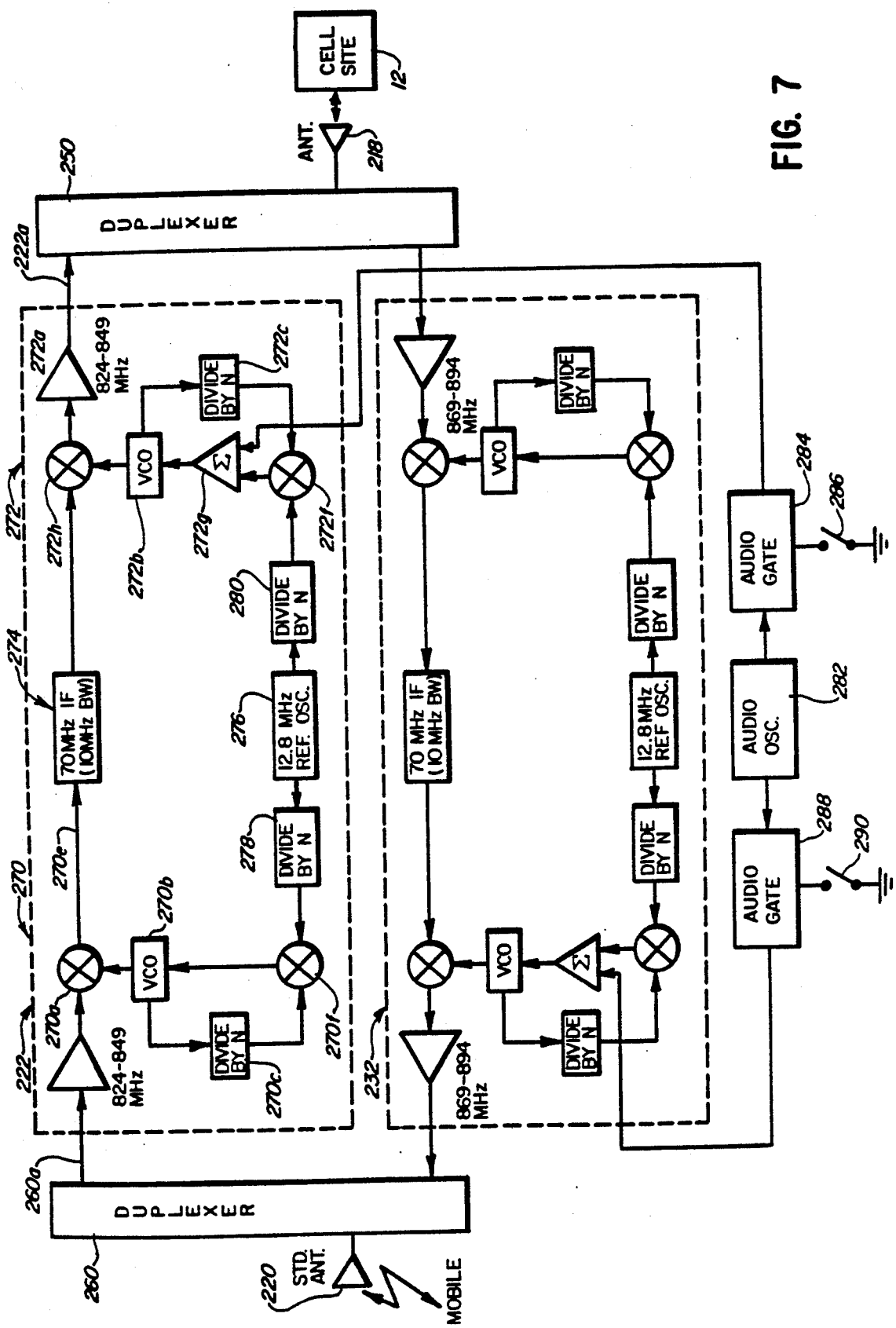
FIG. 7 is a schematic block diagram of a first embodiment of a booster in accordance with the present invention for tagging a boosted signal.

A first embodiment of a circuit accomplishing the modulation of a boosted signal is illustrated in FIG. 7. The circuit provides a low-level frequency-shift tone modulation of the broadband output path. That is, in the frequency conversion scheme of a broadband booster where signals are first converted down to a broadband IF frequency (70 MHz with 10 MHz bandwidth) via a local-oscillator frequency, amplified, and then converted back up to the output frequency by a second local oscillator of the same or a different frequency, the second local oscillator injection is frequency-modulated with a low-level tone. This adds the same modulation to all of the signals that are being boosted in the broadband path. This modulation is typically less than a kilohertz or so. It is typically at a level permitting normal conversations to take place over the voice channels with the tone in the background. Once the testing has been completed, of course, the tone is turned off for normal service. This modulation scheme is implemented by the circuit shown in schematic diagram in FIG. 7.

The communication path 222 shown in FIG. 7 will be understood to be identical to other communication paths (not shown) equivalently as the communication path 22 shown in FIG. 2a is identical to paths 24-30. A description of the structure of path 222 is thus applicable to other paths.

With respect to FIG. 7, the path 222 includes input circuitry 270 and output circuitry 272. Input to the path 222 on a line 260a from the duplexer 260 is a modulated signal in the 824 to 849 MHz range. The circuitry 270 converts that high frequency input on the line 260a to an intermediate frequency in a range on the order of 70 MHz for the purpose of controllably amplifying that signal for retransmission to the cell site 12.

The circuitry 170 includes a mixer 270a. The mixer 270a can be a model SRA-1 marketed by Mini-Circuits Corp., or similar. The mixer 270a is controlled by a local voltage controlled oscillator (Vco) 270b which provides a local oscillator input frequency for conversion of the input signal on the line 260a to the 70 MHz intermediate frequency. Output from the voltage controlled oscillator 270b also provides an input to divide by N circuitry 270c. The divide by N circuitry 270c is a frequency divider element which provides selected signals from the voltage controlled oscillator 270b to a mixer 270f. The mixer 270f can also be a model SRA-1.

Output from the mixer circuitry 270a on a line 270e at the 70 MHz intermediate frequency provides electrical input to the intermediate frequency circuitry 274. The intermediate frequency circuitry 274 is identical to intermediate frequency circuitry 74 shown in FIG. 2a.

Intermediate frequency circuitry 272 includes a linear output amplifier 272a. The linear output amplifier 272a is a radio frequency amplifier providing sufficient signal level in the 824 to 849 MHz range to communicate through antenna 218 to cell site 12. The linear output amplifier 272a combines the functions of driver amplifier 72a and linear output amplifier 64 shown in FIG. 2a.

A reference oscillator 276 provides a 12.8 MHz input signal to the two divide by N circuits 278 and 280. The divide by N circuits 278 and 280 respectively provide a first signal input to respective mixers 270f and 272f. The other signal input to respective mixers 270f and 272f is respectively provided by divide by N circuits 270c and 272c.

As a result of using two mixers 270f, 272f which receive two separately divided reference signals from the common reference oscillator 276, any offset in the input carrier frequency on the line 260a of the signal to be boosted will be translated to the output frequency on the line 222a. The transceiver in the mobile or the transceiver in the cell site 12 controls the basic accuracy of the boosted signal in this configuration.

In accordance with the enhanced modulation scheme of the present invention, the second local voltage controlled oscillator 272b is also frequency-modulated with a low-level tone. This low-level tone, typically 1 KHz in frequency is received from Audio Oscillator 282 via Audio Gate 284 that is controlled for passing the 1 KHz tone by manually-actuated reverse-direction (mobile to donor cell) modulation enable switch 286. The 1 KHz low-level tone gated through the Audio Gate 284 is summed to the signal from mixer 272f in summation junction 272g and used to control voltage controlled oscillator 272b. Voltage controlled oscillator 272b in turn controls mixer 272h.

The above comments also apply with respect to the transmission paths 232 which is used for the purpose of boosting signals from the cell site 12 to the mobile M. The communication path 232 will be understood to be identical to other communication paths (not shown) as the communication path 32 shown in FIG. 2a is identical to paths 34-40 also shown in FIG. 2a.

Particularly, in modulation of the transmission path 232 in accordance with the enhanced modulation scheme of the present invention, it will be noted that the low-level signal output, typically 1 KHz in frequency, from Audio Oscillator 282 is passed to signal path 232 through Audio Gate 288. Audio gate 288 is controlled for passing the 1 KHz low-level tone by manually-actuated forward-direction (donor cell to mobile) modulation enable switch 290. The receipt of the 1 KHz low-level tone of transmission path 232 causes a 1 KHz tone to be impressed on all the boosted communication signals from donor cell 12 to mobile M.

The manually selectable low-level frequency-shift tone modulation of the broadbond output path in accordance with the present invention permits either (i) the boosted signal received at the donor cell 12, (ii) the boosted signal received at mobile M, or (iii) both the respective boosted signals received at donor cell 12 and mobile M to exhibit a background tone. The background tone is not present, of course, in any unboosted transmissions between the donor cell 12 and mobile M. The background tone does not interfere with normal conversation in either direction. It is, in any case, turned off for normal service.

When the background tone is selectively manually enabled it serves to identify, or "tag", the boosted signals (only). An assessment by the receiving mobile user/tester (in the case that boosted signals to the mobile are modulated with the low-level tone), by the communication received through the donor cell, or by both simultaneously, may be made to determine the contribution of the booster to the cellular communications system performance. In particular, the locations, times, and effects of the boost operation may each be audibly determined.

Figure 8:
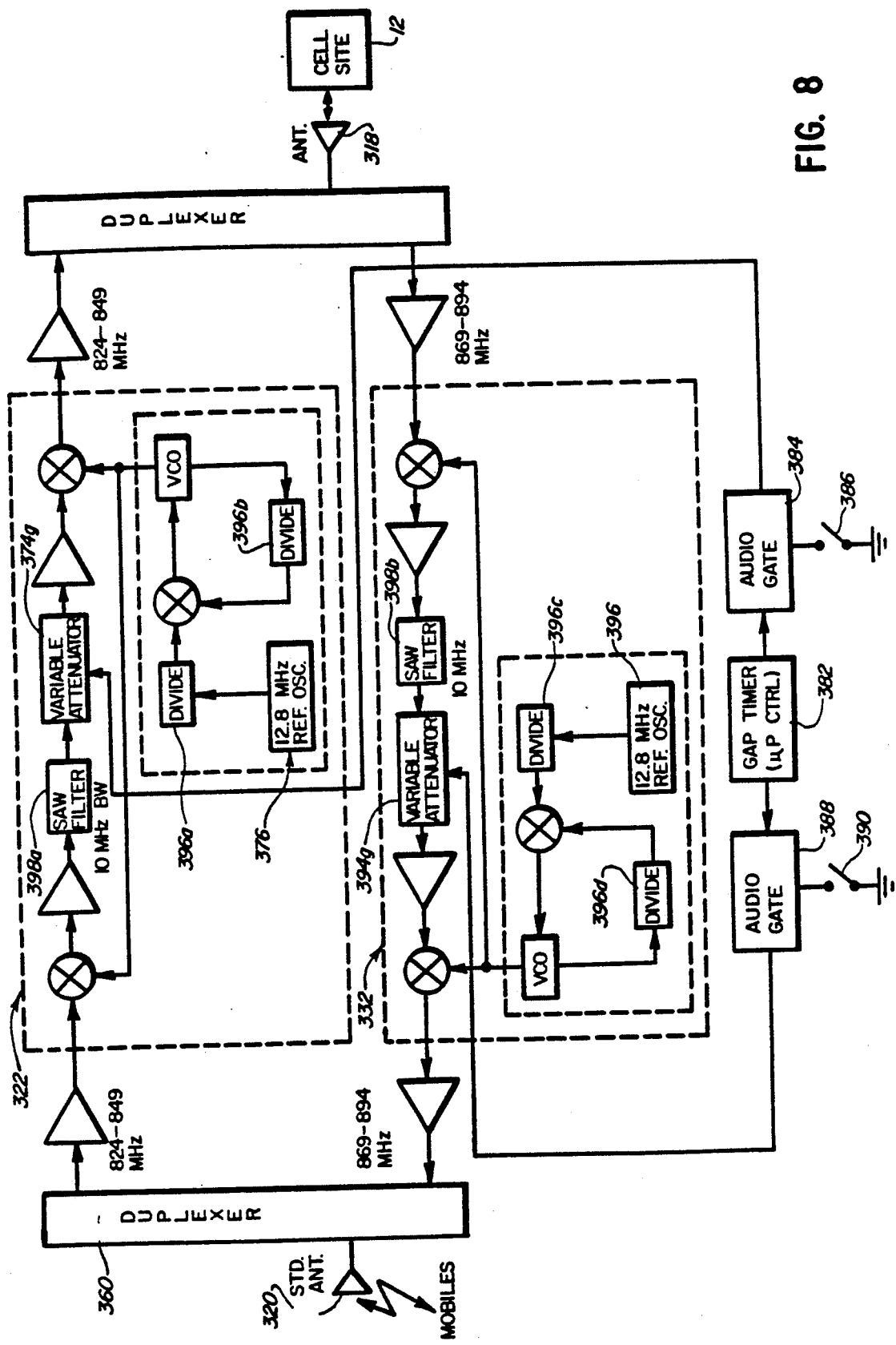
FIG. 8 is a schematic block diagram of a second embodiment of a booster in accordance with the present invention for tagging a boosted signal.

A second embodiment of an circuit for selectively modulating boosted signals in a cellular communications system is shown in FIG. 8. Referencing FIG. 8, the gates 384, 388 are respectively enabled to pass a gap timer signal, normally but not necessarily originating under microprocessor control. Manually actuated modulation enable reverse-direction (mobile to donor cell) switch 386 and forward-direction (donor cell to mobile) switch 390 can be used to enable gates 384 and 388.

The amplitude-gating signals gated through gates 384, 388 are respectively received at variable attenuators 374g, 394g of respective communication signal boost paths 322, 332. The variable attentuators 374g, 394g are individually selectively controllable to attenuate the communications signal transmission paths up to 100% (producing a null signal) responsively to, and for the durations of, the gap timer signals. The variable attenuators 374g, 394g may be simple gates, but typically variably attenuate the communications signal path in preparation to some characteristic of the control gating "gap" signal.

Other elements of FIG. 8 correspond to elements of FIG. 7 described previously. In FIG. 8, the symbols 396a, b, c and d are each divide by N circuits such as the element 270c. The elements 398a, b are 10 MHz bandwith surface acoustic wave filters.

This control "gap" signal normally originates in a microprocessor 382. The microprocessor 382 could correspond to the booster control unit 66.

Figure 9:
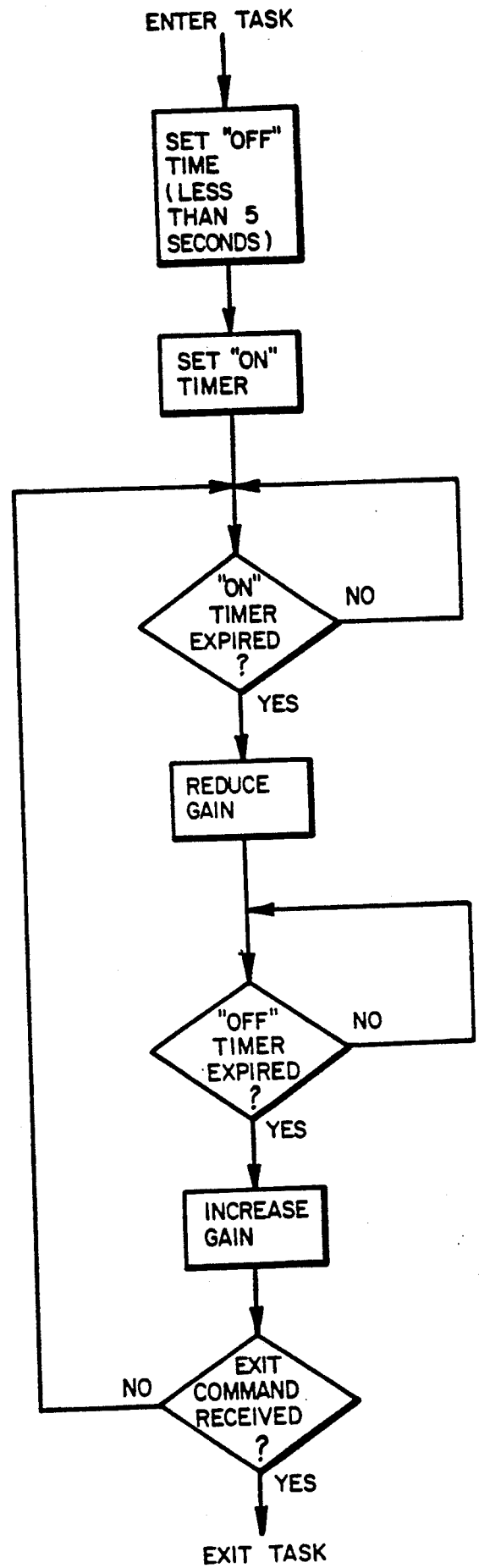
FIG. 9 is a flow diagram at one optional control scheme from the second embodiment of the booster shown in FIG. 8.

A flow diagram of the selectable, timed, sequence for the production of such a signal is illustrated in FIG. 9. This circuit permits more discrimination of performance in the signal overlap areas than does the circuit of the first embodiment. The circuit operates to place a "gap" in the boosted signal on a periodic basis. This gap is typically less than a second or so in order to prevent the SAT (Supervisory audio tone) timer in the cellular mobile from timing out. The "gap" is created by reducing the gain of that particular communication path for a brief period of time from what it normally is.

The user that is in the boosted area will notice a short burst of noise during the gap period when he is in the area where only the booster is providing coverage. In areas that are adequately served directly by the donor cell, no noise gaps will be noticed.

In the overlap areas, the user will note that the gap period is generally free of noise while the non-gap interval may present "multipath" noise (i.e., a rapid fading experienced as the direct and boosted signals beat with each other). The multipath noise will be not unlike that experienced as the user drives to the edge of a coverage area, except in this case the gap interval will provide a clear signal to indicate that a direct signal is being received. A tester of the cellular communications system can note this region as he/she drives across the overlap boundaries.

The circuit for placing a "gap" in boosted cellular communication signals shown in FIG. 8 is similar to the booster circuit shown in FIGS. 1 and 2. However as illustrated, the boosting will transpire in the F1-F1 mode of operation wherein the boosted signal is transmitted at the same frequency at which it is received.

The circuit and method for placing a "gap" is also fully compatible with an F1-F2 mode of operation wherein the incoming signal is retransmitted, after having been boosted, at a different frequency. The F1-F1 mode is shown in FIG. 8 to clearly illustrate that the boosted signal tagging in accordance with the present invention is not limited to selected boosting, but is applicable to all signal boosting and repeating.

The depth of the "gap" can obviously be programmably adjusted as a further refinement of the testing process. That is, the gain of the boosted path can be reduced rather than shut off to allow the tester to determine the effects of reduced gain on coverage and the effect of signal distortion in the signal overlap areas. This will allow the system tester to dynamically determine whether a reduced gain is adequate for good area coverage.

The "gap" approach also has an advantage in that it does not require a separate modulated injection oscillator path for the up-conversion process. That is, a common injection oscillator can be used for both the down-conversion process and the up-conversion process. The common injection oscillators 376, 396 are shown in FIG. 8.

Either the first embodiment of the boosted signal tagging apparatus shown in FIG. 7, or the second embodiment of the apparatus shown in FIG. 8, can be used for forward-direction testing (from the donor cell to the mobile), or for reverse-direction testing (from the mobile to a telephone via the donor cell), or for testing in both directions simultaneously.

The period of time that the booster is in the "non-gap" mode will typically be set longer than that for the "gap" period. This will allow the tester to distinguish between the boosted signal and the direct signal in the signal overlap areas by virtue of the differences in periods. Typical ratios ranging from 2:1 to 5:1 are appropriate for distinguishing between the two sources. The corresponding "gap" duty cycles are thus 16⅔% to 33⅓%.

From the foregoing, it will be observed that numerous variations and modifications may be effected without departing from the spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. A method of measuring the relative contributions to a composite received signal of a signal communicated from a transmitter to a receiver across a first, signal path and the signal simultaneously communicated from the same transmitter to the same receiver across a second, different signal path which includes a booster transceiver having a coverage area, the method comprising:
   modifying the signal within the booster transceiver with an information tag;
   detecting at the receiver the information tag within the composite received signal; detecting the strength of the tag relative to the strength of the composite signal, the detected tag strength being usable for determining the coverage area of the booster transceiver.

2. The method according to claim 1 wherein the modifying step includes modulating the signal in the second path.

3. The method according to claim 2 wherein the modulating includes:
   phase angle modulating.

4. The method according to claim 2 wherein the modulating includes frequency modulating.

5. The method according to claim 2 wherein the modulating is at a sufficiently low level so as to not substantially degrade receipt at the receiver of other information that is modulated onto the second signal by the transmitter.

6. The method according to claim 1 wherein the modifying step comprises:
   creating in the booster transceiver a periodic null gap, or time duration of null signal, within a boosted second signal.

7. The method according to claim 6 wherein the duty cycle of the periodic null gap is less than 50%.

8. The method according to claim 6 wherein the duty cycle of the periodic null gap is on the range of 16⅔% to 33⅓%.

9. The method according to claim 1 wherein the modifying comprises:
   creating a periodic low amplitude gap in a boosted second signal.

10. The method according to claim 9 wherein the duty cycle of the periodic low amplitude gap is less than 50%.

11. The method according to claim 10 wherein the duty cycle of the periodic low amplitude gap is in the range of 16⅔% to 33⅓%.

12. A boosted signal radio communication system comprising:
   mobile radio transmitter-receivers for transmitting radio signals and for receiving radio signals and boosted radio signals;

at least one fixed radio transmitter-receiver for transmitting radio signals and for receiving radio signals and boosted radio signals;

at least one signal-boosting signal repeater means for receiving radio signals from the mobile radio transmitter-receivers and from the fixed radio transmitter-receiver, for amplifying the received radio signals to produce boosted radio signals, and for retransmitting the boosted radio signals, and including means for tagging the radio signals received from at least some of the mobile radio transmitter-receivers upon retransmission as boosted radio signals; and a portable receiver means for receiving the tagged, boosted, radio signals including means for distinguishing the boosted, tagged signals and usable for determining a coverage retransmission area of said repeater means.

13. The system according to claim 12 wherein the repeater means includes means for tagging at least some of the radio signals received from the fixed radio transmitter-receiver upon retransmission as boosted radio signals in order that the tagged, boosted, radio signals may thereafter be detected upon receipt by the portable receiver means.

14. The system according to claim 12 wherein the tagging means includes means for modulating with an audio tone.

15. The system according to claim 12 wherein the tagging means includes means for amplitude modulating to create gaps of reduced signal amplitude.

16. A boosted signal radio communication system comprising:

mobile radio transmitter-receivers for transmitting radio and for receiving radio and boosted radio;

at least one fixed radio transmitter-receiver for transmitting radio signals and for receiving radio signals and boosted radio signals;

at least one signal-boosting signal repeater for receiving radio signals from the mobile radio transmitter-receivers and from the fixed radio transmitter-receiver, for amplifying the received radio signals to produce boosted radio signals, and for retransmitting the boosted radio signals; and for tagging the radio signals received from the fixed radio transmitter-receiver upon retransmission as boosted radio signals in order that the tagged boosted radio signals may thereafter be distinguished upon receipt at a selected mobile radio transmitter-receiver from the radio signals received directly, and means for detecting, audibly tagged and non-tagged signals.

17. The system according to claim 16 wherein the repeater includes further means for tagging the radio signals received from the mobile radio transmitter-receivers upon retransmission as boosted radio signals in order that the tagged boosted radio signals may thereafter be distinguished upon receipt at the fixed radio transmitter-receiver from the radio signals received directly.

18. The system according to claim 16 wherein the repeater's tagged boosted radio signals are modulated with an audio tone.

19. The system according to claim 16 wherein the repeater's tagged boosted radio signals are amplitude gated to create gaps of reduced signal amplitude.

20. An apparatus for receiving and retransmitting one or more selected electro-magnetic signals with at least some of the signals carrying audibly presentable information comprising:

means for sensing one or more selected signals;

means for forming a list identifying one or more of said selected signals as candidates for retransmission pursuant to a predetermined list forming criterion; and means for retransmitting said selected one or more members as electro-magnetic signals bearing the information of said one or more sensed signals plus an indication that said electromagnetic signals are retransmitted, and are not the identical selfsame one or more sensed signals.

21. The apparatus according to claim 20 wherein the means for retransmitting includes means for adding an indication to said electromagnetic signals which indication is audible when said information of said electromagnetic signals is audibly presented to the human hearing.

22. The apparatus according to claim 21 wherein said means for adding modulates at least some said electromagnetic signals at an audio frequency.

23. The apparatus according to claim 21 wherein said means for adding inserts a gap in said information carried by said electromagnetic signals.

24. A method of receiving a plurality of electro-magnetic signals and for retransmitting selected ones thereof comprising:

sensing a plurality of electro-magnetic signals;

comparing a first indicium of each sensed signal to a predetermined threshold;

recording a second indicium for each sensed signal that exceeds the threshold;

selecting one or more sensed signals from among the recorded second indicia; and retransmitting only the selected one or more sensed signals each with an impressed signal modification that is thereafter detectable to evidence that the signals are retransmitted, and are not the selfsame identical one or more sensed signals.

25. An apparatus for receiving and retransmitting one or more selected electro-magnetic signals comprising:

means for sensing plurality of signals;

means for sequentially measuring at least selected ones of said sensed signals and for generating an indicium corresponding to each of selected of said measured signals;

means for comparing each said indicium to a preset threshold;

means for selecting one or more of said sensed signals each having an indicium with a value that exceeds said threshold; and means for retransmitting at least some of said measured signals corresponding to at least some of said selected indicia, including means for adding a signal modification that is thereafter detectable upon receipt of said retransmitted signals to indicate that the signals have been retransmitted.

26. A booster usable in a radio system between a fixed transmitter-receiver and one or more adjacent mobile transceivers, the booster comprising:

means for receiving signals simultaneously from two or more mobile transceivers;

means for measuring a predetermined characteristic of each said received mobile signal;

means for selecting one or more of said received mobile signals in response to said measured characteristics;

a plurality of parallel coupled, adjustable filter means for simultaneously amplifying at least portions of each of said selected mobile signals; and means for adding selected indicia to at least some of said amplified signals; and means for transmitting said amplified signals to the transmitter-receiver.

27. A method of retransmitting to a receiver a plurality of information carrying electro-magnetic signals from a source comprising:

sensing the plurality of signals;

measuring a selected characteristic for each member of the plurality;

selecting one or more members of the plurality for retransmission in response to the results of the measuring steps;

impressing a supplementary indicium upon at least one of the selected signals in a manner that is not substantially destructive of the information carried thereby;

retransmitting the selected signals; and receiving the retransmitted selected signal and recovering the information therein, including the impressed indicium.

28. A method of extending coverage of a fixed radio transmitter-receiver to selected mobile transceivers in a predetermined graphical area, the method comprising:

providing a plurality of signal repeaters;

spacing the signal repeaters throughout at least part of the geographical area such that at least one repeater is in radio communication with the transmitter and a second repeater is in radio communication with the first repeater; and sensing a signal from a mobile transceiver at the second repeater, retransmitting that signal modified by a tag to the first repeater, sensing that modified tagged signal at the first repeater and retransmitting it to the fixed receiver.

* * * * *

UNITED STATES PATENT AND TRADEMARK OFFICE
CERTIFICATE OF CORRECTION

PATENT NO. : 5,023,930

DATED : June 11, 1991

INVENTOR(S) : Samuel Augustus Leslie

It is certified that error appears in the above-identified patent and that said Letters Patent is hereby corrected as shown below:

Title Page,
Assignee:,          "Solen, Ohio" should be --Solon, Ohio--.
Col. 09, line 35,   after "under" insert -- the control of the 63C05--.
Col. 13, line 67,   "t" should be --to--.
Col. 15, line 10,   "Of" should be --If--.
Col. 15, line 46,   "no" should be --not--.
Col. 15, line 51,   after "type" insert -- previously described. A series coupled arrangement--.
Col. 16, line 19,   "in" should be --In--.
Col. 18, line 24,   "EL" should be --E:--.
Col. 27, line 18    "steps" should be --step--.

Signed and Sealed this

Twenty-third Day of March, 1993

Attest:

STEPHEN G. KUNIN

*Attesting Officer*    Acting Commissioner of Patents and Trademarks